United States Patent
Koebel et al.

(10) Patent No.: US 11,965,063 B2
(45) Date of Patent: Apr. 23, 2024

(54) METHOD FOR PREPARING A SILOXANE BASED POLYMERIC LIQUID MATERIAL AND MATERIALS MADE THEREFROM

(71) Applicant: EMPA Eidgenoessische Materialpruefungs- und Forschungsanstalt, Duebendorf (CH)

(72) Inventors: Matthias Koebel, Bruettisellen (CH); Ana Stojanovic, Duebendorf (CH); Wim Malfait, Zurich (CH); Adilien Nour, Duebendorf (CH)

(73) Assignee: EMPA Eidgenoessische Matereialpruefungs- und Forschungsanstalt, Duebendorf (CH)

( * ) Notice: Subject to any disclaimer, the term of this patent is extended or adjusted under 35 U.S.C. 154(b) by 535 days.

(21) Appl. No.: 15/734,657

(22) PCT Filed: Jun. 4, 2019

(86) PCT No.: PCT/EP2019/064557
§ 371 (c)(1),
(2) Date: Dec. 3, 2020

(87) PCT Pub. No.: WO2019/234062
PCT Pub. Date: Dec. 12, 2019

(65) Prior Publication Data
US 2022/0089819 A1    Mar. 24, 2022

(30) Foreign Application Priority Data
Jun. 4, 2018 (EP) ..................... 18175851

(51) Int. Cl.
*C08G 77/20* (2006.01)
*B82Y 40/00* (2011.01)
*C08J 9/228* (2006.01)

(52) U.S. Cl.
CPC .............. *C08G 77/20* (2013.01); *C08J 9/228* (2013.01); *B82Y 40/00* (2013.01); *C08J 2205/026* (2013.01); *C08J 2383/06* (2013.01)

(58) Field of Classification Search
CPC ... C08J 9/228; C08J 2205/026; C08J 2383/06
See application file for complete search history.

(56) References Cited

U.S. PATENT DOCUMENTS

| | | | |
|---|---|---|---|
| 9,957,358 B2 | 5/2018 | Rathore et al. | |
| 2004/0122186 A1 | 6/2004 | Herr et al. | |
| 2005/0049427 A1 | 9/2005 | Kubota et al. | |
| 2007/0197733 A1 | 8/2007 | Salamone et al. | |
| 2009/0215927 A1 | 8/2009 | Mohite et al. | |
| 2010/0305293 A1 | 12/2010 | O'Lenick et al. | |
| 2015/0290113 A1 | 10/2015 | Kim et al. | |
| 2016/0075918 A1* | 3/2016 | Bögershausen | C09D 183/06 524/588 |

FOREIGN PATENT DOCUMENTS

| | | |
|---|---|---|
| CN | 106715538 A | 5/2017 |
| DE | 102008063070 A1 | 7/2010 |
| EP | 0728793 A1 | 8/1996 |
| EP | 1118632 A2 | 7/2001 |
| EP | 1510520 B1 | 7/2006 |
| EP | 3059262 A1 | 8/2016 |
| EP | 1978055 B1 | 3/2018 |
| JP | H05306338 A | 11/1993 |
| JP | 2008174672 A | 7/2008 |
| JP | 2017528577 A | 9/2017 |
| WO | 0040640 A1 | 7/2000 |
| WO | 2004058859 A1 | 7/2004 |
| WO | 2014187972 A1 | 11/2014 |
| WO | 2017155870 A1 | 9/2017 |
| WO | 2018019564 A1 | 2/2018 |

OTHER PUBLICATIONS

Zhao, et al. "Preparation of poly (octadecyl methacrylate)/silica-(3-methacryloxypropyl trimethoxysilane)/silica multi-layer core-shell nanocomposite with thermostable hydrophobicity and good viscosity break property", 307, 891-896, 2017, available only Sep. 7, 2016. (Year: 2016).*
Written Opinion issued for PCT/EP2019/064557 dated Aug. 1, 2019.
Japanese Patent Office, notice of reasons for refusal including English translation provided by the Office, dated Aug. 1, 2023.

* cited by examiner

*Primary Examiner* — Christopher M Rodd
(74) *Attorney, Agent, or Firm* — Agris & von Natzmer LLP; Joyce von Natzmer

(57) ABSTRACT

A polymeric liquid material formed of molecular building blocks of core-shell type architecture, wherein each building block consists of a hyperbranched polysiloxane core and a functional siloxane shell peripherally attached thereto, the material comprising bridging oxygen moieties (Si—O—Si), hydrolysable alkoxy moieties (Si—O—R) and organofunctional moieties (R'—Si—) and ($R_1$—S1-$R_2$) and less than 0.5 mass percent hydroxy moieties (Si—OH). The core has a degree of polymerization $DP_{core}$ in the range of 1.3 to 2.7, the shell is formed of R'-substituted siloxane moieties and has a degree of polymerization $DP_{shell}$ in the range of 0.3 to 2.5. At least 75 atomic percent of all Si atoms in the core are bonded exclusively to alkoxy or bridging oxygens, the remainder each being bonded to 3 oxygens and 1 carbon. The total Si to free hydrolysable alkoxy molar ratio in the material is 1:1.25 to 1:2.75, and the material has a viscosity in the range of 10-100,000 cP. A method for preparing the polymeric liquid material relies on first forming the hyperbranched polysiloxane core followed by a build-up of the functional siloxane shell. To do so, a reaction scheme based on adding stoichiometric amounts of acetic anhydride in a water-free environment is exploited.

19 Claims, 8 Drawing Sheets

METHOD FOR PREPARING A SILOXANE BASED POLYMERIC LIQUID MATERIAL AND MATERIALS MADE THEREFROM

CROSS-REFERENCE TO RELATED APPLICATIONS

This is the U.S. national stage of International application PCT/EP2019/064557, filed Jun. 4, 2019 designating the United States and claiming priority to EP 18175851.7, filed Jun. 4, 2018, which is incorporated herein by reference in its entirety.

FIELD OF THE INVENTION

The invention generally relates to a method for preparing a polymeric liquid material formed of molecular building blocks of core-shell type architecture and to materials made therefrom.

BACKGROUND OF THE INVENTION

With the advancement of the nano age, science is targeting novel preparative methods that allow improved control over chemical building block units—thus linking the atomic to the nanoscale. This creation of novel functional materials by design bridges the interface from molecular to nanomaterials and from polymer to materials science. FIG. 1 shows a rough classification of molecular and nanoscale building blocks in terms of size. Molecular building blocks (MBBs) typically consist of a few tens to a few thousand atoms and are at most a few nanometers in size. Depending on their chemistry and compactness, they are often liquids under ambient conditions. This is a clear distinguishing feature from nanomaterials which are solids at room temperature and composed of thousands to many millions of atoms. As indicated in the figure, there is no sharp boundary between those material classes and some overlap around 1 nm.

According to IUPAC, nanotechnology deals with novel materials with dimensions in the size range from approximately 1 nm to 100 nm with structure, properties and interactions that can be quite different from macroscopic materials. The so-called bottom-up approach, where molecular precursors used to create nanoscale building blocks (NBBs) such as nanoparticles etc. by means of chemical reactions offers maximum flexibility for controlling new functionality and final material properties. In this particular area of technology, the assembly of NBBs is commonly starting from atomic or small molecule precursors. Typical examples include

- polymer nanoparticles prepared from organic monomers by emulsion polymerization,
- noble metal nanoobjects obtained from corresponding salt precursors in solution by chemical reduction,
- (semi)metal oxide nanoparticles or "colloidal sols" synthesized from corresponding (semi)metal salts or small molecule organometallic precursors such as alkoxides, acetylacetonates etc.

More recently, researchers have been targeting the controlled bottom-up synthesis of novel functional materials at the molecular level by precisely controlling structure formation steps at the interface between small molecule and nano- or even macroscale. In the case of metal organic frameworks (MOFs) for example, molecular interactions are specifically chosen and designed to combine organic and metal/metal oxide precursors in such a way that macrosopically large, crystalline compounds with molecular level controt are obtained. Clearly, the molecular design approach grants access to an unprecedented diversity of material properties. Similar concepts pursued in colloidal chemistry and polymer chemistry are at the forefront of today's materials science.

In the state of the art, introducing specific chemical functionality in both, MBBs or NBBs, is achieved by either introducing the function bearing species throughout the entirety of the building block or by selective grafting onto the surface of a core block. In nanotechnology, the term core-shell describes a nanoobject where a core is overgrown with a layer of a second—often function bearing—compound. In molecular and polymer science the term core-shell is not well established, however given the strong analogy, we are here extending the "core-shell" terminology to MBBs and hyperbranched siloxane polymer science.

Amongst the classical representatives of dendritic MBBs with high compactness, star-polymers are a subclass of polymer materials where dendritic arms made of a given polymer chemistry are emanating from a nucleus onto which they are grafted. DE 10 2008 063070 A1 describes such a star polymer, where the peripheral polymer arms have been functionalized with anionic or cationic groups linked by silane chemistry to improve surfactant properties, but the primary constituents are non-silicon based. Further, US 2004/0122186 elaborates on two and four arm core-spacer-end group materials. The compounds described therein are connected through hydrosilylation chemistry and include different molecular architectures, namely i) bisphenol-A organic core, dimethyl-siloxane spacer(s) and organic group (epoxy, methyl styrene, cyclopentadienyl) termini, ii) a tetrakis(dimethylsilyl)-siloxane core, dicyclopentadiene spacer (or terminus) followed by a second tetramethyldisiloxane spacer and an epoxy or unsaturated terminus. US 2007/19773 A1 describes a similar class of materials based on a polyaromatic organic core of 3- and 6-fold symmetry, siloxane spacer arms and reactive organic end groups. In US 2010/0305293, pure siloxane star polymer compounds without the use of "non-silicon" organic components are proposed. In the current state of the art, silane and siloxane containing star polymers are generally obtained by consecutive molecular coupling reactions each of which extend the shell by one building block unit. Coupling is most commonly achieved through hydrosilylation chemistry and yield low- to medium molecular weight polymers with well defined composition and sizes in the Angstrom to single nanometer range.

In contrast, organic/inorganic hybrid materials and NBBs can be obtained through a rich variety of preparative techniques. Sol-gel technology for example operates in liquid solution, starting from a colloidal suspension of molecular or oligomeric precursors resulting in the spontaneous formation of nanoparticle building blocks. On the one hand, sols can be prepared in-situ from olation and condensation reactions of oligomeric polyhydroxymetallates (e.g. silicic acid oligomers in the case of silica) through control of solvent, pH etc. They are used as classical NBBs to create porous metal oxide and hybrid materials. The more widely adapted route to metal oxide sols is from metal alkoxides such as TEOS, TMOS, Al- or Ti iso-propoxide etc. in their respective parent alcohols and water as a reactant. In a first step, hydrolysis of alkoxy groups leads to M-OH species, which then condense to form the amorphous metal oxide NBB or sol. Given the nature of the reversible interplay between condensation of M-OH and hydrolysis of M-O-M bonds, the obtained material morphology is difficult to control but strongly affected by pH, precursor concentration and solvent system. The preparation of colloidal sols using hydrolytic methods is always a compromise between avoiding gelation, achieving a high degree of branching and reducing the amount of volatile monomer fractions. Branched siloxane compounds with low molecular weight are obtained by acid catalyzed hydrolysis in neat systems (solvent free) as described in EP 1510520 A1.

The preparation of chemically modified colloidal sols with a controlled core-shell type architecture e.g. a TEOS based NBB with a shell made out of a second, functional silane is complicated by the fact that hydrolysis and condensation kinetics of different silanes (TEOS vs. the functional silane) can be vastly different, leading to poor surface selectivity of the deposition as shown schematically in FIG. 2. This holds particularly true for the cohydrolysis of two different silane compounds, where there is a clear preference for forming a heterogeneous mixture of "silane A" and "silane B" particles rather than pure phase hybrid "AB" particles with a homogeneous, statistically mixed composition.

To improve on the deposition selectivity of functional shells on NBBs, slowing down the reaction kinetics is often the only choice. EP 1978055 A1 describes the functionalization of commercial "Ludox" silica particles and similar colloids with a shell made of functional organosilanes in dilute aqueous solution by slow dosing of the functional silane and at a pH of 4 where the hydrolysis/condensation kinetics are very slow—the reaction mixture is allowed to react for a period of 24 h at room temperature. A more rapid alternative is emulsion based radical polymerization chemistry: EP 1118632 A2 describes composite nanoparticles and their preparation, where polymer core particles obtained by emulsion polymerization are coated with a layer of an organosilicon compound through suitable condensation chemistry. EP 3059262 A1 describes the inverse case, namely a PDMS-like core prepared as an emulsion coated by a polyacrylate shell made by radical emulsion polymerization mediated through the use of an acrylate function bearing silane coupling agent. Another, very similar PDMS core/organic poly-(alkenyl aromatic) shell hybrid NBB material is described in US 2009/0215927.

In the world of silicon based MBBs, hyperbranched poly-alkoxysiloxanes (hyPASs) are amongst the most promising candidates to afford both functionality and size control in one and the same molecule. hyPASs are small molecular building blocks with typical molecular weights ranging from 500 to 50'000 g/mol, spanning a size range from several Angstroms to single digit nanometers. In comparison to the above-mentioned "sol-gel" hydrolytic route, hyPASs are most commonly prepared by "non-hydrolytic" methods meaning that the condensation reactions used to bond small molecule precursors to form larger, macromolecular MBBs can be controlled by stoichiometric addition of the reactants and hence started, stopped and resumed at any given point in time. Furthermore, the synthesis can be carried out "neat", that means in absence of additional solvents like water or alcohols. Because of their close to spherical and compact nature, hyPASs exhibit lower melt viscosities and a much greater solubility than their linear polymer analogues. The classical preparative "non-hydrolytic" synthesis routes for single component hyPASs are:

1) Condensation of hydroxides obtained by reaction of an alkoxysilane with an alkali hydroxide (silanol route)
2) Condensation of chlorides with alkoxysilanes (chloride route)
3) Condensation of a single alkoxysilane with itself by ether elimination
4) Condensation of an acetoxyfuctional alkoxysilane with itself by elimination of the corresponding acetic acid ester (acetoxy route)
5) Condensation of alkoxysilanes by reaction with acetic anhydride in presence of a suitable catalyst by acetic acid ester elimination (anhydride route).

Method 1) is rather impractical since it requires quantitative amounts of strongly caustic alkali hydroxides and recuperating and disposing of the corresponding waste products.

Method 2) is described in EP 0728793 A1, where the preparation of hyperbranched polysiloxanes proceeds through heterocondensation of chloro- and alkoxysilanes through alkyl halide elimination. The reaction is catalyzed by Ti, V and Zr containing organometallic compounds. Industrial commercialization is limited because of the highly corrosive nature of the chlorosilane reagents.

Method 3) bears large safety related hazards in an industrial setting due to the formation of dialkyl ethers with very low boiling points and extreme flammability. Furthermore, such a homo-condensation of alkoxides is not self-terminated by the consumption of a second, stoichiometrically limiting species such as chloro-, hydroxy- or acetoxy-silanes and thus will need to be stopped by thermal quenching at an arbitrary point in time without precise knowledge of the reaction progress, thus making product control much more challenging.

Method 4) generally uses rather costly acetoxysilanes. WO 00/40640 A1 describes the preparation of lightly branched organosilicon compounds through acetoxy derivatization starting from dimethylsiloxane prepolymers which are crosslinked using trifunctional silanes. The patent further describes the usefulness of the classic acetoxy route when only a few condensation bonds need to be made i.e. when connecting monomeric with oligomeric/polymeric building blocks to create larger macromolecules. This can be done for example by refluxing silanol terminated prepolymers with alkoxy terminated crosslinkers in the presence of acetic acid under refluxing at elevated temperature or directly with acetoxy-terminated crosslinkers (e.g. triacetoxysilanes).

Method 5) was recently invented by Moeller et al. (e.g. Macromolecules 2006, 39, 1701-1708)—it is today the most advanced technique for hyPAS preparation in terms of scalability, process safety and ease of implementation. It offers drastically improved commercialization potential over 1) through 4) and the closest state of the art to this invention but at the same time fails to address the issue of selective "core-shell" like functionalization of hyPASs. Consequently WO 2004/058859 A1 limits itself to the preparation of single component hyPAS MBBs by means of the anhydride route: In the examples, the authors discuss the one-step preparation of pure silicate and titanate polyalkoxymetallates from their respective alkoxides but in the central claim 1, also others, specifically zirconates and hafnates are mentioned. The same patent further describes the analogous preparation of single component organofunctional hyPASs prepared from organofunctional-trialkoxysilanes, specifically from methyltriethoxysilane (MTES) and heptadecafluoro-(1,1,2,2)-tetrahydrodecyltriethoxysilane in later examples. Organofunctional trialkoxysilanes are ideal precursors for introducing chemical function due to the large choice and attractive pricing of commercially available compounds. WO 2004/058859A1 does not exclude the preparation of statistically mixed, multicomponent hyPASs—which would be the most obvious way to introduce specific organic chemical functionality—but also does not further elaborate on the concept.

As an extension to Moeller's original work, WO 2014/187972 A1 deals with the chemical functionalization of Silicate hyPASs prepared by Moeller's route 5) and their application as additives in coating formulations. Functional precursors are created by alcohol condensation of hydroxyl terminated polymers (preferred examples are poly-alkylene oxides such as PEG, PPG and polydimethylsiloxanes (PDMS)) with accessible alkoxy groups on a "Moeller-type" hyPAS at temperatures in the range of 130° C. In this way, PEG, PPG, PDMS etc. modified core-shell like MBBs are created, yet without the complete freedom to prepare the shell in a bottom-up manner that is with full control over composition and shell substructure. The main difference to this invention lies in the mode of shell grafting by means of a single chemical bond formed to attach preformed, linear chain polymer molecules onto the hyPAS core.

SUMMARY OF THE INVENTION

It is an object of the present invention to provide improved hyPAS materials, methods for producing the same and various applications thereof.

According to one aspect of the invention (claim 1), there is provided a method for preparing a polymeric liquid material formed of molecular building blocks of core-shell type architecture, each building block consisting of a hyperbranched polysiloxane core and a functional siloxane shell peripherally attached to said core, the method comprising the following steps:

a) charging at least one silicon tetraalkoxide $Si(OR)_4$, wherein R is an unbranched or branched alkyl group with up to four carbon atoms; and, optionally, a functional admixture of
one R"-organofunctional trialkoxysilane R"—$Si(OR)_3$ and, optionally, an $R_3,R_4$-organofunctional dialkoxysilane $R_3$—$Si(OR)_2$—$R_4$; or
a mixture of different R"-organofunctional trialkoxysilanes and, optionally, at least one $R_3,R_4$-organofunctional dialkoxysilane;
in monomeric or in oligomeric form, into a reaction vessel together with a first stoichiometric amount of acetic anhydride selected according to the desired $DP_{core}$, in the presence of a catalyst;

b) heating up the reaction mixture provided in step a) in a water-free, inert atmosphere under stirring to reach a desired reaction temperature and distilling off resulting acetic acid ester reaction product until the reaction and the flow of distillate stop, thereby forming said hyperbranched polysiloxane core;

c) adding
one R'-organofunctional trialkoxysilane R'—$Si(OR)_3$ and, optionally, an $R_1,R_2$-organofunctional dialkoxysilane $R_1$—$Si(OR)_2$—$R_2$, or
a mixture of different R'-organofunctional trialkoxysilanes and, optionally, at least one $R_1,R_2$-organofunctional dialkoxysilane,
wherein:
R' and R" are independently selected substituents each representable as L-Z, wherein
L is a linker group selected from the group consisting of —$C_6H_4$—, —$C_6H_4$—$CH_2$—, —$CH_2$—$CH_2$—$C_6H_4$—$CH_2$— and [$(CH_2)_2$]$_n$, with n=0, 1, 2, 3, 4; and Z is a terminal functional group selected from the following:

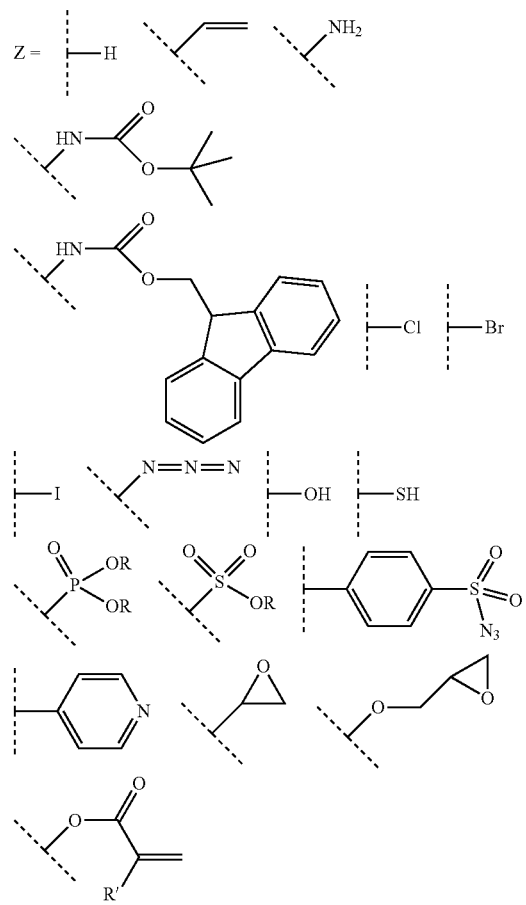

wherein R* is selected from the group consisting of —H, —$CH_3$, —$C_2H_5$, —$C_3H_8$, —$C_4H_{10}$ and —$C_6H_5$;
or Z is —[$(CH_2)_2$]$_m$—$CH_3$ with m=0, 1, 2, . . . , 11;
and
wherein $R_1$, $R_2$, $R_3$ and $R_4$ are substituents independently selected from the group consisting of —$CH_3$, —$C_2H_5$, —$C_6H_5$, —$C_6H_{11}$, —CH=$CH_2$, —$CH_2$—$CH_2$—Cl and —$O_5H_5$,
with the provision that the triplets (R', $R_1$, $R_2$) and (R", $R_3$, $R_4$) are not identical;
together with a second stoichiometric amount of acetic anhydride selected according to the desired $DP_{shell}$, optionally in the presence of a catalyst, to the hot reaction mixture formed in step b) with continuing stirring, thus initiating a selective build-up of said functional siloxane shell onto the core produced in step b), whereby further acetic acid ester is formed and distilled over, and continuing the reaction until the distillate flow ceases again;

d) optionally building additional functional layers in the shell by repeating the addition and reaction protocol described in step c) at least once;

e) optionally removing low-molecular reaction products and/or residual starting materials in the reaction mixture by vacuum distillation through gradually lowering the pressure inside the reaction vessel and holding a final pressure in the range of 5 to 250 mbar for a period of time between 10 and 120 minutes, f) cooling down and isolating the polymeric liquid material thus obtained;

wherein steps a) through e) are carried out in one and the same reaction vessel.

As will become clearer below, the core may comprise, in addition to a principal, non-organofunctional siloxane component, a limited content of organofunctional siloxane moieties. The shell is by definition only composed of organofunctional siloxane moieties. The provision that the triplets (R', $R_1$, $R_2$) and (R", $R_3$, $R_4$) are not identical means that the shell composition and the composition of an optional function bearing core component are not identical.

In the above preparation method, the amount of reactants used in the various steps will be selected in accordance with the desired composition of the polymeric liquid material to be formed. In particular, the amount of reactants will be chosen so as to meet the content limitations defined further below.

In the present context, the term "functional admixture" shall be used to address an amount of at least one organofunctional trialkoxysilane and optionally dialkoxysilane to be added in step a). With such an admixture, the core can be provided with certain functional characteristics.

Advantageous embodiments are defined in the dependent claims and in the following description and examples.

According to one embodiment (claim 2), the functional admixture is zero. In other words, the core is composed substantially exclusively of non-organofunctional siloxane moieties.

According to a further embodiment (claim 3), R is methyl or ethyl.

According to another embodiment (claim 4), the reaction temperature for steps b) through e) is in the range from 70° C. to 170° C., preferably in the range of 100° C. to 150° C. and most preferably in the range from 120° C. to 140° C. and the pressure during steps b) through d) is in the range of 0.1 bar to 2 bar, preferably in the range of 0.5 bar to 1.4 bar and most preferably in the range of 0.9 bar to 1.2 bar.

According to yet another embodiment (claim 5), the silicon tetraalkoxide $Si(OR)_4$ is tetraethoxysilane (TEOS) or tetramethoxysilane (TMOS) or a mixture of monomers and oligomers thereof.

According to a further embodiment (claim 6), acetic acid ester reaction product is removed from the system through a distillation column comprising several theoretical plates in such a way that the lower boiling reaction product is separated from higher boiling residual reactants in solution whereby the latter are continuously fed back into the reaction mixture.

According to a still further embodiment (claim 7), the catalyst is selected from the group of $Ti(OR")_4$ or $Zn(II)$ alkanolates $Zn(OR")_2$ wherein $R"=-CH_2CH_3$, $-CH(CH_3)_2$, $-CH_2CH_2CH_3$, $-C(CH_3)_3$, $-CH_2CH_2CH_2CH_3$, or the catalyst is $Ti(O-Si(CH_3)_3)_4$, wherein and the catalyst amount is between 0.01 and 1.5% on a mol basis of total alkoxysilane precursor used in the core growth step.

According to yet another embodiment (claim 8), R' is selected from the following groups:
i) $R'=-C_6H_5$, $-CH=CH_2$,
ii) R'=L-Z and L is $-CH_2-$ and $Z=-[(CH)_2]_p-CH_3$ with p=0, 1, 2, 4, 6, 8, 10, 12, 14,
iii) R'=L-Z and $L=-CH_2CH_2CH_2-$ (n-propyl) and $Z=-Br$, $-Cl$, $-I$, $-SH$, $-OH$, $-NH_2$, $-NH-$(BOC), $-NH$-(FMOC), -(2-oxiranyl), -methoxy-(2-oxiranyl), $-N_3$, $-SO_3R$, $-PO_3R_2$, -acrylate, -methacrylate, -ethacrylate, -propacrylate, -butacrylate, or
iv) R'=L-Z and $L=CH_2$, Z=vinyl, -acrylate, -methacrylate, -ethacrylate, -propacrylate, -butacrylate, with $R_1$ and $R_2$ being equal and selected from the group consisting of $-CH_3$, $-C_6H_5$, and $-CH=CH_2$ or with $R_1=-CH_3$ and $R_2=-CH=CH_2$.

According to a further aspect (claim 9), there is provided a polymeric liquid material prepared by the method of the present invention implemented without functional admixture. The material is formed of molecular building blocks of core-shell type architecture, each building block consisting of a hyperbranched polysiloxane core and a functional siloxane shell peripherally attached to said core, the material containing less than 0.5 mass percent hydroxy moieties (Si—OH), the core having a degree of polymerization $DP_{core}$ in the range of 1.3 to 2.7, particularly 1.5 to 2.5, the shell being formed of R'-substituted siloxane moieties and optionally R1-,R2-substituted siloxane moieties and having a degree of polymerization $DP_{shell}$ in the range of 0.3 to 2.5, particularly 1.0 to 2.3, wherein the total silicon to free hydrolysable alkoxy molar ratio in the material is 1:1.25 to 1:2.75, wherein the material has a viscosity in the range of 10 to 100,000 cP, and wherein the core is composed of non-organofunctional siloxane moieties comprising non-organofunctional terminally bonded siloxane moieties ($Q^1$ speciation) of the general formula

and/or non-organofunctional disiloxane moieties ($Q^2$ speciation) of the general formula

and/or non-organofunctional trisiloxane moieties ($Q^3$ speciation) of the general formula

and/or non-organofunctional tetrasiloxane moieties (Cr speciation) of the general formula and wherein the shell is composed of:

monoorganofunctional terminally bonded siloxane moieties (T$^1$ speciation) of the general formula

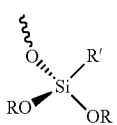

T$^1$ and/or monoorganofunctional disiloxane moieties (T$^2$ speciation) of the general formula

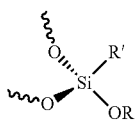

T$^2$ and/or monoorganofunctional trisiloxane (T$^3$ speciation) moieties of the general formula

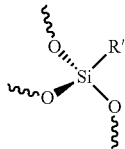

T$^3$ and, optionally, terminally bonded diorganofunctional siloxane (D$^1$ speciation) moieties of the general formula

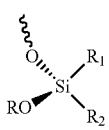

D$^1$ and/or diorganofunctional disiloxane (D$^2$ speciation) moieties of the general formula

D$^2$ wherein R, R', R$_1$ and R$_2$ are as defined in claim 1.

According to one embodiment, the material has a viscosity in the range of 50 to 5'000 cP.

Advantageously (claim 10), the relative atomic ratio of T to Q species is in the range 0.03:1 to 1:1 preferably, 0.03:1 to 0.75:1 and most preferably 0.05:1 to 0.5:1.

According to another aspect of the invention (claim 11), there is provided a hydrolysis product obtainable by reacting a polymeric liquid material according to the first aspect with a predetermined amount of water or with a predetermined amount of a water-solvent mixture.

According to further aspects, the polymeric liquid material according to the further aspect or the corresponding hydrolysis product according to the second aspect are used for various applications as defined in claims 12 and 13.

Surprisingly, it was found that the acetic anhydride reaction (i.e. Method 5) mentioned in the introduction) can be used in a consecutive manner to selectively build up a functional shell on an existing hyPAS core or nucleus by dosing a single organofunctional silane compound or mixture, containing at least one organofunctional trialkoxysilane under identical reaction conditions.

Direct Reaction Products
- are clearly macromolecular in nature with typical sizes of its constituting core-shell MBBs below 2 nm;
- exhibit a statistical distribution of molecular weights with variable content of unreacted monomer and small oligomers depending on the chosen reaction conditions; low-molecular species can be optionally removed and reused by vacuum distillation. Individual building blocks typically contain 30 to 500 Si atoms;
- have a considerable content of hydrolysable, reactively crosslinking alkoxy groups in both the core and the shell;
- are essentially solvent free liquid mixtures of neat MBBs with viscosities ranging from 10-100,000 cP;
- are star-polymer like in terms of the molecular structure of MBBs.

A clear differentiation from other star polymers from the known state of the art can be made in terms of the hyperbranched nature of the core, indicating a substantial degree of crosslinking in the core and more importantly the nature of the shell in terms of its variable size (from end capping to variable length primarily linear polymer chains). Practically relevant formulations fall within a limited range of polymerization of both core (DP$_{core}$=1.3-2.7) and shell (DP$_{shell}$=0.3-2.5) substructures.

For this invention, the term "core-shell" has been adopted from nanomaterials science. Based on the clearly macromolecular character of the reaction products covered by this invention, the interface between core and shell must be understood as a diffuse shell rather than a sharp boundary at which composition changes abruptly. This diffuse shell layer architecture, where the concentration of the functional shell species varies over a few bond lengths or Angstroms, is a direct result of the condensation chemistry, that is, the grafting of a functional silane shell onto a preformed hyPAS core. Because the outer arms of the dendritic hyPAS core are highly permeable to smaller silane monomers and oligomers, it is clear that the extent of grafting of the shell is highest on the periphery but there is no sharp cutoff. Nevertheless, the term "core-shell" still applies as grafting in the center of the core is highly hindered for both, steric reasons and reduced availability of reactive alkoxy groups, because the average connectivity (number of bridging oxygen linkages (Si—O—Si bonds) per silicon center) in the center of the core is higher than at the core perimeter. Consequently, the term "core-shell" will be used in the context of the present invention in the sense of a hyPAS core with a diffuse shell according to the above argumentation.

The degree of polymerization DP for any non-crystalline silicon oxide material can be defined as the ratio of bridging oxygens BO (# of Si—O—Si bonds) to the total number of metal atoms $Si_{tot}$ in the system.

For a degree of polymerization of:

DP=4, all Si atoms are bonded to four other neighbors, i.e. this is the case in a perfect crystal (quartz) with four oxygen atoms sitting in the tetrahedral sites of each center Si and each Si atom sees exactly the same environment DP=3, on average, each Si atom is bonded to three other Si atoms through bridging oxygen linkages (Si—O—Si). If a single component were to have DP=3, its structure would be an infinitely extended two-dimensional sheet, similar to sheet like clay minerals.

DP=2, on average each Si atom is bonded through two bridging oxygen bonds. The single component analogue would be a linear polymer such as for example uncrosslinked PDMS (polydimethylsiloxane) type silicone resins.

The acetic anhydride reaction is quantitative in terms of its reagents (alkoxide and acetic anhydride). Hence, the number of new bonds formed as a result of its addition and also DP are directly proportional to the stoichiometric conversion factors f (and g of the core i) and shell ii) buildup reactions as shown below.

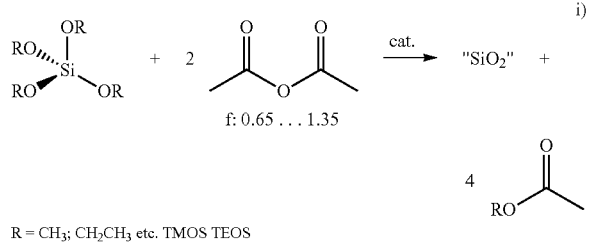

R = $CH_3$; $CH_2CH_3$ etc. TMOS TEOS

The core formation from a tetraalkoxide model compound (equation i)), the maximum stoichiometric factor f=2 corresponds to an acetic anhydride to tetraalkoxide ratio of 2:1 which would lead to a practically impossible DP=4, that is complete conversion to $SiO_2$.

Mechanistically, the acetic anhydride reaction proceeds through an acetoxy intermediate with elimination of a first aliquot of acetic acid ester as shown in equation $i_a$). The acetoxy intermediate then undergoes intermolecular condensation with an alkoxy group on a second molecule under elimination of a second aliquot of acetic acid ester as shown in equation $i_b$).

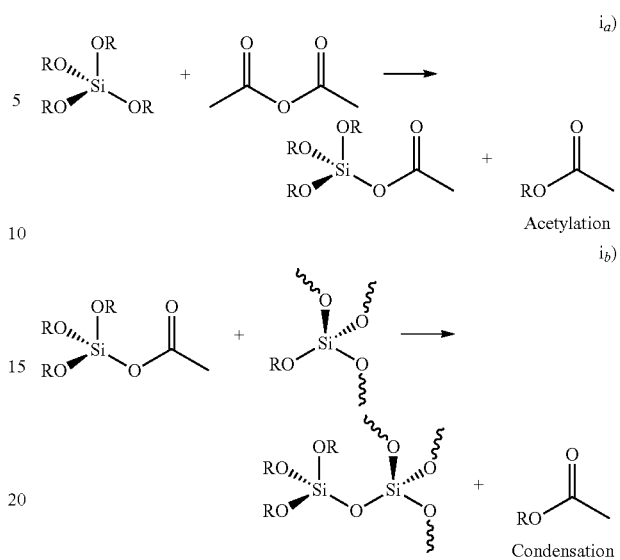

As already described in Möllers original work, organofunctional trialkoxysilanes can be converted to hyPASs as well using anhydride chemistry according to equation ii),

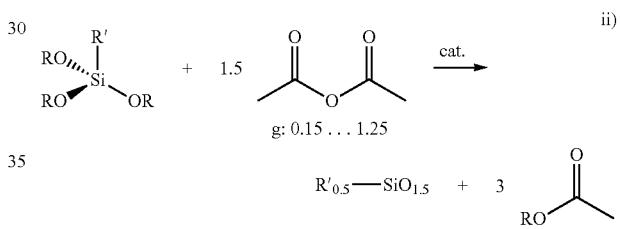

although yielding a lower $DP_{core}$ because of the lower number of alkoxy groups (3 instead of 4) available for condensation reactions. Mechanistically, di- and trialkoxysilanes react in the same way as tetraalkoxysilanes.

Most glasses and hyPASs feature average DP values which are significantly below their theoretical limit (full conversion of all alkoxy groups). During preparation, theoretical DP values are given by the stoichiometric ratio used in the reaction and effective DP values can be directly determined through quantitative analysis of the acetic acid ester reaction product. Independently, $DP_{core}$ and $DP_{shell}$ of the material can be directly obtained from quantitative NMR data. In the simple model case of a single component hyPAS derived from a tetraalkoxysilane, DP can be calculated from quantitative $^{29}Si$ NMR spectra (FIG. 3) according to $$DP=\Sigma(nA_{Qn})/\Sigma(A_{Qn})=(A_{Q1}+2A_{Q2}+3A_{Q3}+4A_{Q4})/(A_{Q0}+A_{Q1}+A_{Q2}+A_{Q3}+A_{Q4})$$

where $A_{Qn}$ denotes the quantitative $^{29}Si$ NMR peak area related to that $Q^n$ species, which is a Si atom coordinated by n bridging oxygen (BO) atoms that link it to next-nearest-neighbor Si atoms by Si—O—Si bridges and 4-n non-bridging oxygen (NBO) atoms, i.e. alkoxy groups Si—OR.

In the case of a pure tetraalkoxysilane model system and assuming quantitative conversion, DP is directly linked to the stoichiometric f-factor (equation i) by the simple relation $$DP=2f$$

For organofunctional Di- and Trialkoxysilanes, the $^{29}$Si spectral fingerprint regions are shifted progressively further downfield allowing a clear separation of the different non-organofunctional $Q^n$ from organofunctional $T^m$ and $D^l$ chemistries as seen in the model compound spectrum after shell deposition (FIG. 4). Here, $A_{Tm}$ stands for the peak area under the curve of each Si species belonging to an organofunctional trialkoxysilane with m BO and (3-m) NBO and $A_{Dl}$ to the peak area originating from an organofunctional dialkoxysilane with l BO and (2-l) NBO.

However, determining a degree of condensation and polymerization of core-shell molecules is more complex. The degree of polymerization of the core prior to the addition of the shell precursor and additional acetic anhydride ($DP_{core,initial}$), follows the equations for the pure system and can be determined by quantitative $^{29}$Si NMR (FIG. 3) or from the stoichiometry:

$$DP_{core,initial} = \Sigma(nA_{Qn})/\Sigma(A_{Qn}) = (A_{Q1} + 2A_{Q2} + 3A_{Q3} + 4A_{Q4})/(A_{Q0} + A_{Q1} + A_{Q2} + A_{Q3} + A_{Q4}),$$

$$DP_{core,initial} = 2f$$

where $A_{Qn}$ are derived from a quantitative $^{29}$Si NMR spectrum collected on an aliquot of sample taken before the addition of the shell precursors.

For an MBB material featuring a shell grown from an organofunctional trialkoxysilane over an existing tetraalkoxysilane core according to this invention, addition of new monomers and acetic anhydride, where g is defined as the molar ratio of acetic anhydride to organofunctional trialkoxysilane, leads to the following reactions.
  i) continuation of the core polymerization (Q-Q condensation),
  ii) homocondensation of T species (T-T condensation), and
  iii) grafting of functional silanes onto the existing core siloxane branches (T-Q condensation).

Homocondensation reactions (T-T) only increase the degree of polymerization of the shell ($DP_{shell}$), but heterocondensation (T Q) increases both $DP_{core}$ and $DP_{shell}$ according to an exemplary grafting reaction iii) given below:

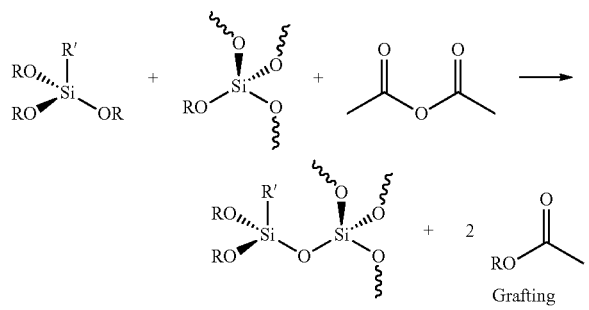

Grafting

Note that in example of the above grafting reaction, the R' organofunctional trialkoxysilane is converted from $T^0$ to $T^1$ while the core species on the left-hand side of the reaction (symbolyzed by the three wavy siloxane bonds) from $Q^3$ to $Q^4$, illustrating that each grafting reaction simultaneously increases $DP_{core}$ and $DP_{shell}$. There are obviously all sorts of other combinations of possible grafting reactions e.g. a $T^2$ species grafting onto a $Q^2$ yielding $T^3$ and $Q^3$, respectively, or $T^1$ species grafting onto a $Q^2$ yielding $T^2$ and $Q^3$ etc.

Experimental results suggest that T-Q condensation (grafting) is the preferred reaction in the limits described by this invention. As seen from FIG. 5, the $^{29}$Si—$^{29}$Si INADEQUATE NMR spectrum displays clear signals related to Q-Q and Q-T correlations, but the peaks related to T-T homocondensation are below the detection limit, evidence that grafting of trifunctional silanes onto pre-assembled cores is the dominant T condensation mechanism, rather than T-T condensation and/or the formation of pure phase polycondensate species made of organofunctional trialkoxysilane building blocks.

The final degree of polymerization of the core-shell macromolecules can be determined from the quantitative $^{29}$Si NMR spectra after the reaction with the shell precursors is completed according to:

$$DP_{core,final} = \Sigma(nA_{Qn})/\Sigma(A_{Qn}) = (A_{Q1} + 2A_{Q2} + 3A_{Q3} + 4A_{Q4})/(A_{Q0} + A_{Q1} + A_{Q2} + A_{Q3} + A_{Q4})$$

$$DP_{shell} = \Sigma(mA_{Tm})/\Sigma(A_{Tm}) = (A_{T1} + 2A_{T2} + 3A_{T3})/(A_{T0} + A_{T1} + A_{T2} + A_{T3})$$

$$DP_{total} = [\Sigma(nA_{Qn}) + \Sigma(mA_{Tm})]/[\Sigma(A_{Qn}) + \Sigma(A_{Tm})]$$

where $A_{Qn}$ and $A_{Tm}$ are derived from a quantitative $^{29}$Si NMR spectrum collected after the reaction with the shell precursors is completed (FIG. 4).

Because of the aforementioned reactions i) through iii), $DP_{core,final}$ and $DP_{shell}$ cannot be calculated directly from f, g, and the $n_{shell}/n_{core}$ ratio because the relative importance/selectivity of the T-T and T-Q reactions is not a priori known and will depend on the relative reactivities of the $Q^n$ and $T^m$ monomers and the higher molecular hyPAS core species. Nevertheless, f, g, and $n_{shell}/n_{core}$ are linked to the respective degrees of polymerization through to the following equations.

$$DP_{total} = 2[n_{core}/(n_{core} + n_{shell})] \cdot f + 2[n_{shell}/(n_{core} + n_{shell})] \cdot g$$

$$2g = (n_{core}/n_{shell}) \cdot \Delta DP_{core} + DP_{shell}$$

where $\Delta DP_{core} = DP_{core,final} - DP_{core,initial}$, as determined from the quantitative $^{29}$Si NMR spectra collected after (FIG. 4) and before (FIG. 3) the addition of the trifunctional monomer and acetic anhydride.

MBBs according to this invention are composed of a tetraalkoxysilane based hyPAS core. The choice of the f-factor during core assembly determines $DP_{core, initial}$ (not to be confused with the claimed design parameter $DP_{core}$ which is identical with $DP_{core, final}$) and consequently also the size, molecular weight and degree of branching of the core before shell growth. The shell is composed of a single polysiloxane layer made up from organofunctional trialkoxysilane monomers or mixtures grown in a second (and possibly in additional subshells) in (a) subsequent, temporally separated step(s). Optionally, the shell monomer mixture(s) contain(s) a minority of organofunctional dialkoxysilanes.

The desired amount of acetic anhydride (g-factor) added during shell growth determines its size (average length of polymer chains) and morphology. Higher g factors (g=0.75-1.25) yield chain-like slightly branched organodisiloxane shells, whereas lower g-factors (g=0.15-0.5) favor end-capping of the core with organofunctional monomers and short oligomers. On the other hand, low g-factor conversion is always accompanied by a relatively high amount of unreacted monomer ($T_0$ species) in the reaction mixture which may not be desirable for practical applications, but which can be removed by distillation if necessary.

MBBs covered by this invention span a wide range of architectures in terms of the amount of material composing core and shell as it is illustrated in the specific examples given in FIG. 6. This range of control over the shell function can be best discussed in terms of the ratio of molar amounts of precursor monomers used to build up shell and core ($n_{shell}/n_{core}$). In general, lower $n_{shell}/n_{core}$ ratios<0.2 produce materials which are to be thought of as functional dendrimers and whose surface chemistry is dominated by the core composition, whereas higher $n_{shell}/n_{core}$ ratios>0.5 produce materials that are clearly star-polymer-like in nature with their surface chemistry dominated by the shell composition. In the intermediate composition range of $n_{shell}/n_{core}$ between 0.2 and 0.5, the surface chemistry and reactivity is determined by both, core and shell compounds. For any given $n_{shell}/n_{core}$, the bonding mode of the shell species can be controlled by the amount of acetic anhydride added during the shell growth step (g-factor) which directly influences the speciation population observed in the $^{29}Si$ NMR spectra.

For $DP_{total}>2.0$ the total amount of unreacted monomer species (defined as $Q^0$, $T^0$, $D^0$ for the corresponding tetra-, tri- and di-alkoxysilanes) in the crude MBB reaction mixture according to this invention is less than 10% by weight, preferable less than 5% by weight and most preferably less than 2% by weight. The amount of unreacted monomer species can be further reduced by distilling off residual monomers after the core and before the shell growth step. The amount of unreacted monomer species in the NBB hydrolysis product according to this invention is less than 1% by weight.

In an advantageous embodiment, the core is derived from silicon tetraalkoxides, preferably TEOS or TMOS or low molecular commercial oligomers thereof such as Dynasilan 40 (Evonik industries) or equivalent, and the shell from single component monomeric organofunctional trialkoxysilanes or multicomponent trialkoxysilane mixtures, respectively.

In a further advantageous embodiment, the core is derived from silicon tetraalkoxides, preferably TEOS or TMOS or its low molecular commercial oligomers such as Dynasilan 40 (Evonik industries) or equivalent, and a single component shell is composed of a mixture of monomeric organofunctional trialkoxysilanes and dialkoxysilanes. By replacing organofunctional trialkoxysilanes by dialkoxysilanes, the content of hydrolysable reactive crosslinker groups Si—OR can be precisely controlled. In this way, MBBs with more hydrophobic, polydimethylsiloxane (PDMS, silicone) like properties and reduced sensitivity to water can be obtained and the exact properties tailored according to application specific needs.

In another advantageous embodiment, the shell is prepared so as to be composed of more than one layer of different organofunctional trialkoxysilanes and optionally also dialkoxysilanes. Just like for selectively growing the shell on top of the core by temporal separation of core and shell assembly, additional layers of organofunctional siloxane can be grown by repeating the shell growth procedure once or several times. In a particularly preferred embodiment, the first shell carries organofunctional groups selected from the group of methyl, vinyl etc. which serve the primary purpose of controlling hydrophobic and hydrolysis/condensation properties of the resulting MBB materials and the outermost shell layer carries specific functions selected to assist reactive crosslinking, polymerization and interface compatibility with application relevant matrices such as thiol, (BOC or FMOC protected) amines, vinyl, acrylates, phosphonic or sulfonic acid esters etc.

In a further advantageous embodiment, the core is prepared to also contain a minor component (less than 25% on a molar basis) with selected chemical function which could e.g. increase the adsorption/incorporation of guest species such as metal and transition metal ions or small molecule drugs etc. in order to control and preferably custom-tailor functionality. Particularly suited for this are cores composed of mixtures consisting of a tetraalkoxysilane, preferably TEOS (tetraethoxysilane) or TMOS (tetramethoxysilane) or its oligomers and organofunctional trialkoxysilanes bearing specific ligand groups (—NH$_2$, SH, —PO$_3$H) or covalently bonded positively or negatively charged species (—SO3$^-$, —PO$_3^{-2}$, COO$^-$, —NR$_3^+$). Ligand group bearing functionality is preferably introduced by core coassembly of the main tetraalkoxide component together with a protected functional group monomer precursor (e.g. —NH—BOC or —NH-FMOC, —NH(butylidene), —SO$_3$R, —PO$_3$R$_2$ terminated trialkoxysilanes).

One of the main advantages of the novel class of MBBs covered by this invention is the fact that these materials are essentially free of hydroxyl species (Si—OH mass content<0.5%) which means that they offer greatly improved stability and shelf life over conventional sol-gel based hybrid materials and substantially more structural control. In practical applications, MBBs can be used "as is" in nonpolar organic solvents, blends etc. or directly incorporated into hydrophobic matrices such as polymer melts.

The relative amount of core and shell material can vary in a substantial range. According to an advantageous embodiment, the shell-to-core molar ratio $n_{shell}:n_{core}$ is 0.05 to 2.0, preferably 0.1 to 1.0.

According to a further embodiment, the relative atomic content of T species in the shell is at least 10% and preferably at least 20%.

According to one aspect, the MBB product is converted into a nanoscale building block by hydrolysis in water directly or in a suitable water/solvent system in the presence of an acid or base catalyst if needed. The hydrolysis product according to this invention is a nanoscale building block (NBB) but with a perfectly controllable molecular substructure and custom tailorable function as shown schematically in FIG. 7. Compared to the state of the art, such novel hydrolysis product NBBs have the advantage of improved composition control and more efficient use of the shell component (the function bearing tri- and dialkoxysilane) which are often the cost-limiting component in practical applications.

Further, an advantageous method of preparation for MBBs is outlined. A hyPAS core is prepared first according to the core buildup reaction i), that is combining a silicon tetraalkoxide such as TEOS or TMOS with a selected substoichiometric amount f of acetic anhydride in the presence of a catalyst and heating the mixture to a typical reaction temperature in the range of 120-140° C. Mechanistically, the acetic anhydride reacts first with a free alkoxy group in a rate-limiting step to form an acetoxy intermediate (equation i$_a$) and a first molecule of acetic acid ester reaction byproduct. In the second step (equation i$_b$), the acetoxy intermediate then reacts with a second alkoxy group on a monomer, oligomer or already existing hyPAS molecule to form a M-O-M (in this case Si—O—Si) bond and a second acetic acid ester byproduct molecule. Initially the concentration of starting materials (tetraalkoxide and acetic anhydride) is high which means the kinetic rate is high and the acetic acid ester is building up quickly in the reaction mixture. The onset of the reaction can therefore be followed by the boiling over of the acetic acid ester byproduct formation, which has a significantly lower boiling point than both the starting materials and the hyPAS primary reaction product. As the reaction proceeds, with more and more siloxane bonds being formed, the average hyPAS core size, molecular mass and hence $DP_{core,\ initial}$ increase. With higher f-factors, also the NMR speciation evolves towards higher $Q^n$. Acetic anhydride is used in substoichiometric amounts in the starting mixture, thus it will run out at some point and the reaction self terminates. Again, because the reaction is fully stoichiometric with respect to the starting materials, the progress of the reaction or, more technically, the degree of polymerization $DP_{core,\ initial}$ is directly proportional to the f-factor and the statistically weighed sum of $DP_{shell}$ and $\Delta DP_{core}$ is directly proportional to the g-factor. This means that core and shell growth are separated in time and can be controlled independently from one another.

Once the core assembly is completed and distilling over of the acetic acid ester has stopped, it is then endcapped and/or overgrown with the organofunctional siloxane shell by at least one addition but optionally also multiple subsequent, controlled additions of an organofunctional trialkoxysilane compound or mixture and optionally also an organofunctional dialkoxysilane or mixture together with the selected substoichiometric amount (g-factor) of acetic anhydride needed for shell polymerization to the same reaction mixture at temperature with continuing stirring. During or shortly after the addition, the distilling over of additional acetic acid ester reaction byproduct is resumed. Note that organofunctional trialkoxy- and dialkoxysilanes contain only three and two alkoxy groups available for the acetic anhydride reaction and hence the effective g-factor needs to be adjusted to a given specific shell or subshell mixture. The substoichiometric acetic anhydride to total shell silane monomer ratio is defined as the g-factor and is typically selected such that $DP_{shell}$ remains in the range from 0.3-2.5. According to this invention, the mole fraction of trialkoxysilane based T-species in the shell must but be at least 5%, 10% and preferably at least 20%.

In a further advantageous embodiment, multicomponent shell architectures are deposited by repeating the shell addition procedure multiple times with different organofunctional trialkoxysilane and optionally dialkoxysilane monomers. Each monomer is preferably added together with its selected equivalent amount of acetic anhydride needed to create the desired degree of condensation of the subshell in question.

As it is known from the originally published work on hyPASs reported by Moeller et al. (Macromolecules 2006, 39, 1701-1708), the degree of polymerization/f-factor is limited to values around 2.5/1.25 respectively for single component tetraalkoxysilane compounds. The explanation lies in the fact that pure hyPAS cores keep growing with more and more M-O-M bonds formed as DP/f increases. At some point we will reach the situation where most low-molecular species have reacted off and from then on, dendritic arms of the hyPASs will be joined together by additional condensation reaction. This explains why the viscosity of such compounds increases dramatically with DP/f values above 2.2/1.1, respectively, also translating in a sizable range of accessible liquid material viscosities. For single precursor TEOS hyPASs model compound prepared using Moeller's method, f-factors above 1.3 will result in a solid, three dimensionally crosslinked product which is no longer soluble. Core shell MBBs according to this invention are also limited in size with the general limitation being directly linked to the sum of f and g factors ($DP_{total}$). Following the same logic as for the original model system by Moeller, grafting of a trifunctional organofunctional trialkoxysilane onto a hyPAS core with additional acetic anhydride leads to MBB growth. As the organofunctional trialkoxysilane monomers being grafted and converted up the echelon $T^0 \rightarrow T^1 \rightarrow T^2 \rightarrow T^3$ with increasing g-factor, the same situation will arise as for the pure hyPAS components, namely that most monomer and small molecular species have been reacted off and it becomes statistically likelier that new bonds formed are connecting two arms through residual alkoxy groups. In experimental studies, the same sharp increase in viscosity is observed once a core of a given f-factor is further converted to core-shell MBBs and the g factor is steadily increased, eventually leading to the formation of a fully three dimensionally crosslinked rubber or gel-like material.

The characterization of the reaction products in terms of viscosity is readily analyzed by means of standardized viscosity measurements such as a cylindrical rotation viscometer according to for example ASTM E2975-15: "Standard Test Method for Calibration of Concentric Cylinder Rotational Viscometers". Other viscosity test methods are also possible such as Staudinger-type capillary viscometers or modern dynamic viscometry methods.

The characterization of the reaction products in terms of molecular precursors and DP for both core and shell is easiest for single component core/single component shell materials, where speciation of core and shell readily analyzed from quantitative solution $^{29}Si$ NMR measurements. For more complex compositions, in general, $^{29}Si$ NMR still allows a clear separation of core and shell organofunctional components given the organic function specific spectral shifts. The chemically specific analytical protocol for a general case (with optional functional admixture according to claim 1) involves preparing the core as described in claim 1, drawing an aliquot sample and subjecting it to $^{29}Si$-NMR analysis, which allows the determination of $DP_{core,\ initial}$ followed by carrying out one or multiple shell growth steps and again analyzing the final material by means of $^{29}Si$-NMR, yielding $DP_{core,\ final}$ and $D_{shell}$.

For the specialized case where the admixture of functional silane constituents in the core growth step is zero (claim 2) and its dependent material claim (claim 9), a single $^{29}Si$ NMR spectrum of the final material is sufficient to characterize it in terms of $DP_{core}$ and $DP_{shell}$, as the relative quantities can be derived directly from Q-type and T,D-type NMR spectral signatures, respectively.

One of the central aspects of this invention is the grafting of shell monomers onto the preformed cores. 2D INADEQUATE $^{29}Si$—$^{29}Si$ NMR studies on TEOS-core/MTES (methyltriethoxysilane)-shell model compounds have revealed strong crosspeaks between $Q_2/T_2$, $Q_2/T_1$, which are strong evidence for the direct grafting of functional T species onto a Q core. More importantly the high selectivity is underlined by the absence of T-T crosspeaks in the 2D NMR spectra. Surprisingly, the rate of dosing of the shell monomers did not noticeably change the product distribution as one would expect by analogy with seeded-growth type core-shell nanoparticles. This is supported by the observation that the speed of the shell assembly reaction measured by the distillation rate of the acetic ester reaction product was found quite independent of the rate of the trifunctional silane addition.

In order to allow sufficiently fast kinetics to yield reasonable reaction times, the use of elevated temperature in conjunction with a catalyst are required for the non-hydrolytic acetic anhydride chemistry. The reaction temperature for steps b) through e) is in the range from 70° C. to 170°

C., preferably in the range of 100° C. to 150° C. and most preferably in the range from 120° C. to 140° C. The pressure during steps b) through d) is in the range of 0.1 bar to 2 bar, preferably in the range of 0.5 bar to 1.4 bar and most preferably is between 0.9 bar and 1.2 bar.

Depending on the reaction temperature, some of the monomers and the acetic anhydride reagent are near their boiling points. Each reaction step (core and shell/subshell formation) taking typically between half an hour and several hours, depending on the catalyst type and concentration used, some of the reagents are prone to distilling over together with the acetic ester byproducts. This leads to gradual losses of selected reagents, depending on their boiling points and thus to lower or higher effective f/g factors and also DP values than anticipated form the stoichiometry used. These losses can be quantified as the difference between the molar amounts of acetic anhydride used (f, g factors) and the effectively formed bonds (NMR analysis, quantification of acetic acid ester reaction products).

In an advantageous embodiment (claim 6), the loss of monomers and/or acetic anhydride reagents over the course of the reaction is counteracted by equipping the reactor with a distillation attachment containing a separation stage with a few theoretical plates connected to a distillation bridge, thus allowing quantitative separation of the low boiling acetic ester reaction byproducts from unused higher boiling volatile reagents, the former being then fed back straight into the reactor. This greatly improves both accuracy (effective DP values agree with selected amount of reagents used) and reproducibility (deviation of theoretical versus effective f, g factors depends on starting monomers & reaction temperature etc.) of the method of production.

As reported by Möller in his original patent application, catalysts used for the acetic anhydride non-hydrolytic method are advantageously selected from the family tetraalkoxy-titanates $Ti(OR)_4$ or Zinc diethanolates $Zn(OR)_2$ where R=—$CH_2CH_3$, —$CH(CH_3)_2$, —$CH_2CH_2CH_3$, —$C(CH_3)_3$ or —$CH_2CH_2CH_2CH_3$. More recent studies have identified Tetrakis(trimethylsiloxy)titanium Ti(O—Si$(CH_3)_3)_4$ as a particularly suitable catalyst. Catalyst concentrations are generally in the range from 0.02% mol to 1.5% mol based on the total molar amount of silicon alkoxides used for the MBB preparation. The catalyst is typically added in the core buildup step and dosing of additional catalyst during the shell growth step is optional but generally not necessary.

Advantageously (claim 7), the catalyst is selected from the group of $Ti(OR")_4$ or Zn(II)alkanolates $Zn(OR")_2$ wherein R"=—$CH_2CH_3$, —$CH(CH_3)_2$, —$CH_2CH_2CH_3$, —$C(CH_3)_3$, —$CH_2CH_2CH_2CH_3$ or the catalyst is Ti(O—Si$(CH_3)_3)_4$ and the catalyst amount is between 0.01 and 1.5% on a mol basis of total alkoxysilane precursor used in the core growth step.

In summary, this invention solves the task of a selective shell growth of organofunctional trialkoxysilanes, optionally containing also organofunctional dialkoxysilanes, onto a hyPAS "core" by a temporally separated reaction giving rise to a new group of functional molecular building blocks (MBBs) with extreme variability in terms of composition, architecture and properties within a limited window of stoichiometric core/shell compound ratio. Furthermore, the hydrolysis product derived from MBBs covered by this invention offer a new way to prepare nanoscale building blocks (NBBs) with great precision and control over their subnanometer structure and composition. The corresponding method for production of core-shell MBBs involves a two or multistep reaction in which the preparation of a core derived primarily from selected silicon tetraalkoxides or oligomers thereof by a non-hydrolytic acetic anhydride method is followed in time by selective deposition of a mixture containing at least an organofunctional trialkoxysilane and optionally organofunctional dialkoxysilanes using the same acetic anhydride reaction. The temporally separated shell deposition can be repeated multiple times, allowing the assembly of complex multilayer shell architectures.

BRIEF DESCRIPTION OF THE DRAWINGS

The above mentioned and other features and objects of this invention and the manner of achieving them will become more apparent and this invention itself will be better understood by reference to the preceding description of various embodiments of this invention taken in conjunction with the accompanying drawings, wherein are shown.

DETAILED DESCRIPTION OF THE INVENTION

Figure 1:
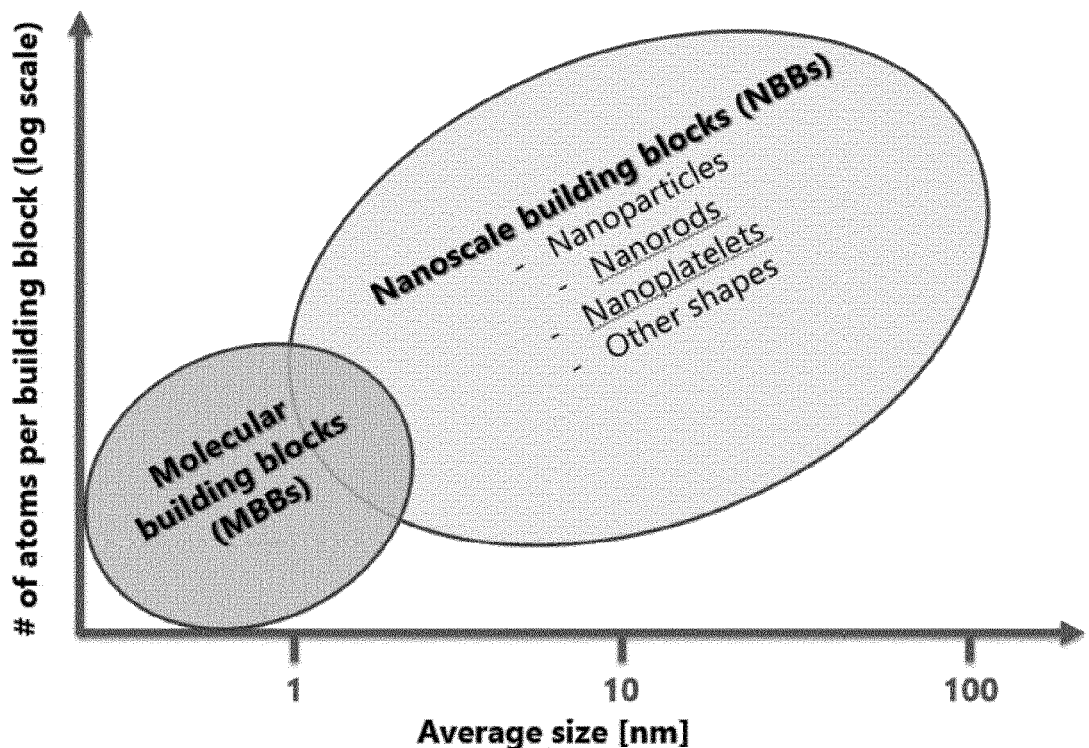
FIG. 1 a rough classification of molecular and nano science in terms of number of constituent atoms and effective size.
Figure 2:
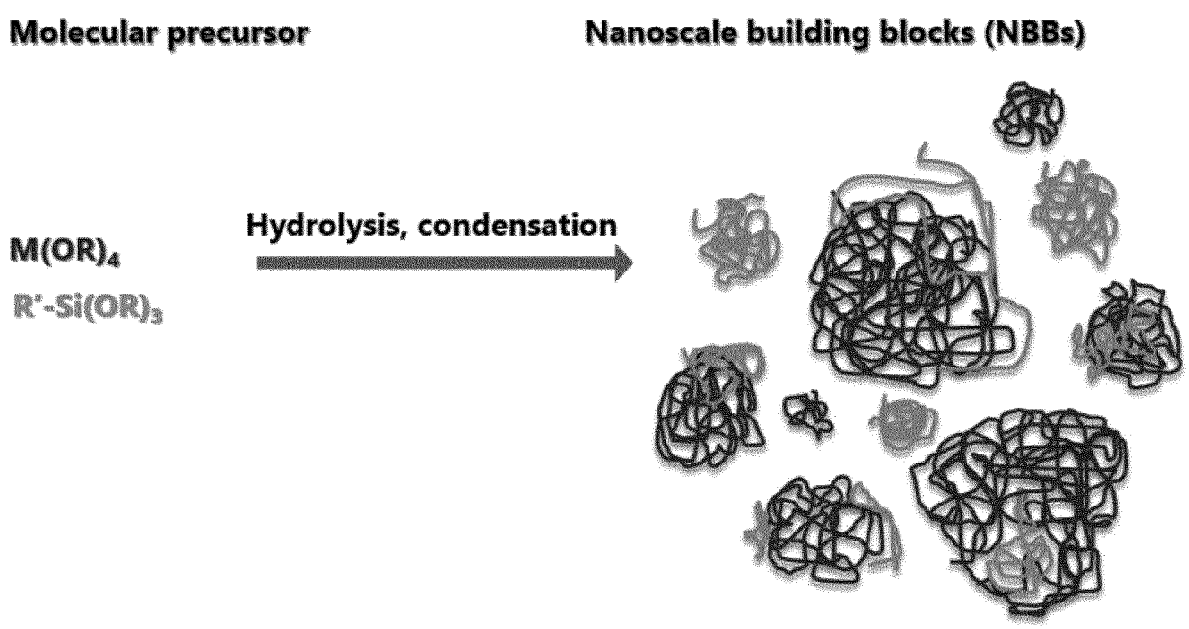
FIG. 2 limitation of classical hydrolytic sol-gel methods to prepare functional nanoscale building blocks (NBBs); the product distribution of NBBs is determined by stochastic events in solution and relative reaction rates of the different alkoxide and silane precursors and hence poorly controllable.
Figure 3:
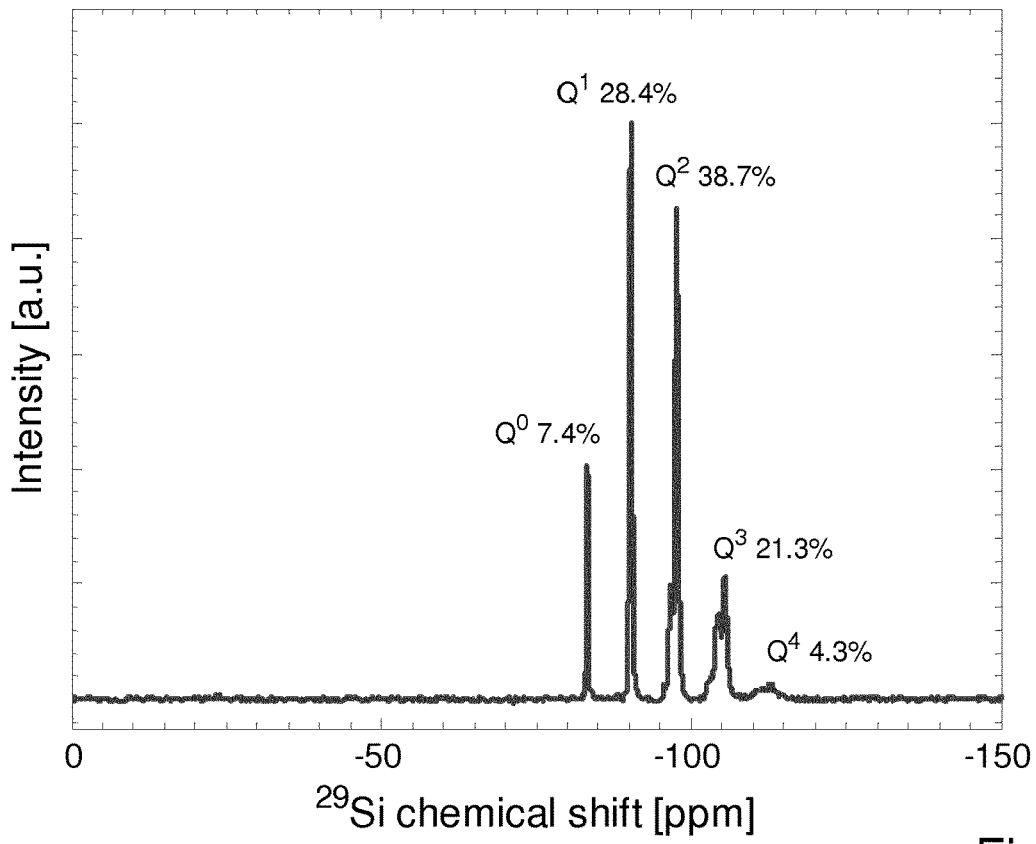
FIG. 3 quantitative $^{29}Si$ NMR spectrum of the core, collected before the growth of the shell: $DP_{core,initial}=1.87$.
Figure 4:
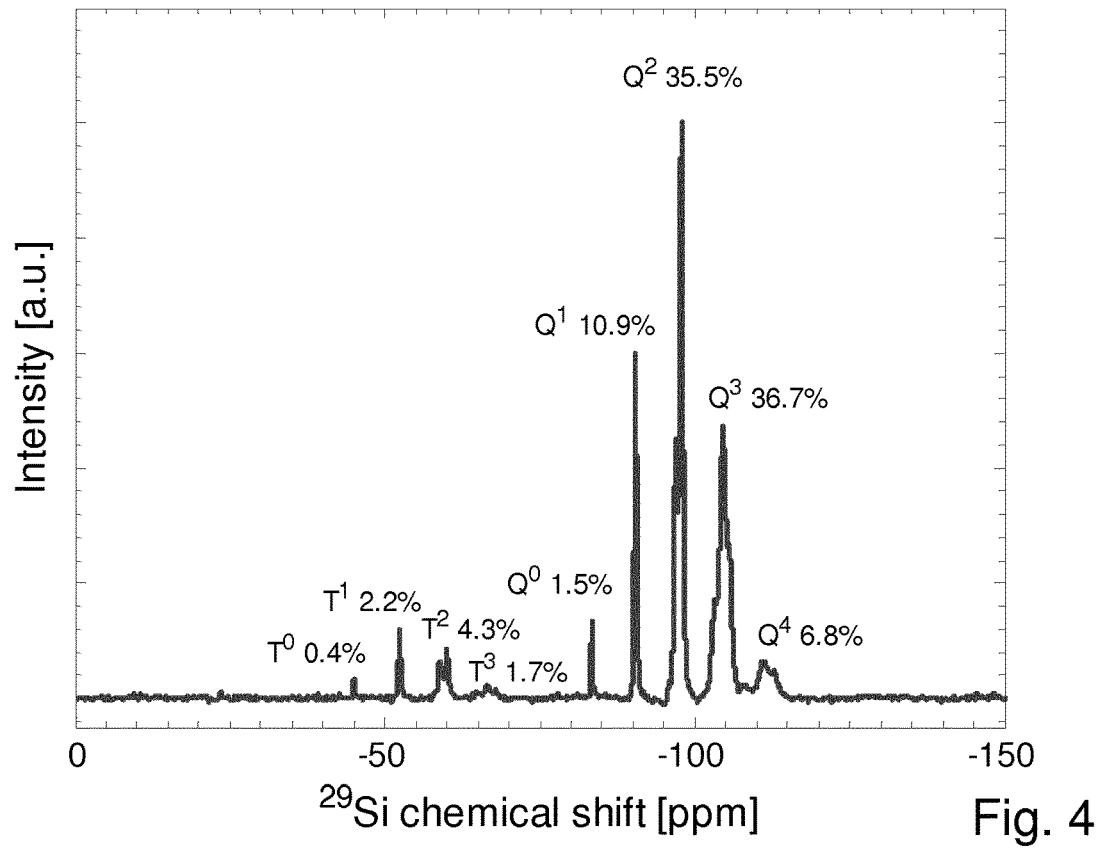
FIG. 4 quantitative $^{29}Si$ NMR spectrum of a core-shell sample with a TEOS based core and MTES based shell: DP 2.40, $DP_{core,final}=2.40$, $\Delta DP_{core}=2.40-1.87=0.53$, $DP_{shell}=1.86$, $n_{shell}/n_{core}=0.09$, $DP_{total}=2.35$.
Figure 5:
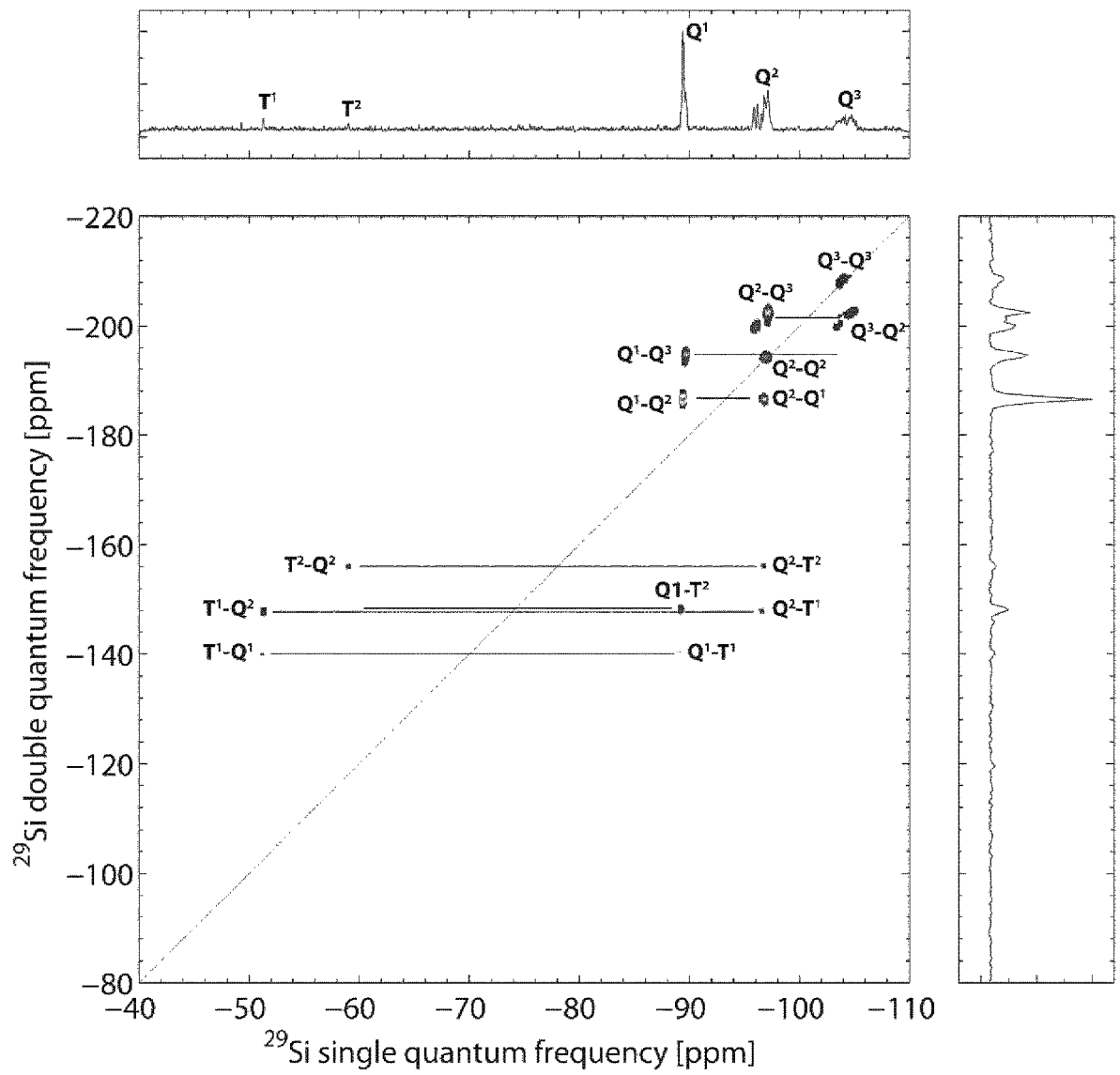
FIG. 5 $^{29}Si$—$^{29}Si$ INADEQUATE NMR spectrum and its projections of a core-shell sample with a TEOS based core and MTES based shell ($n_{shell}/n_{core}=0.38$, $DP_{core,final}=2.33$, $DP_{shell}=2.08$, $DP_{total}=2.26$ from quantitative $^{29}Si$ NMR). Peaks are evidence of a covalent Si—O—Si bridge between the various T and Q species; on-diagonal peaks are evidence for a neighboring pair of the same species (e.g. $Q^2$-$Q^2$ or $Q^3$-$Q^3$). Neighboring species that are dissimilar show up as a pair of peaks symmetrical around the diagonal (e.g. the pair of $T^2$-$Q^2$ and $Q^2$-$T^2$ peaks)
Figure 6A:
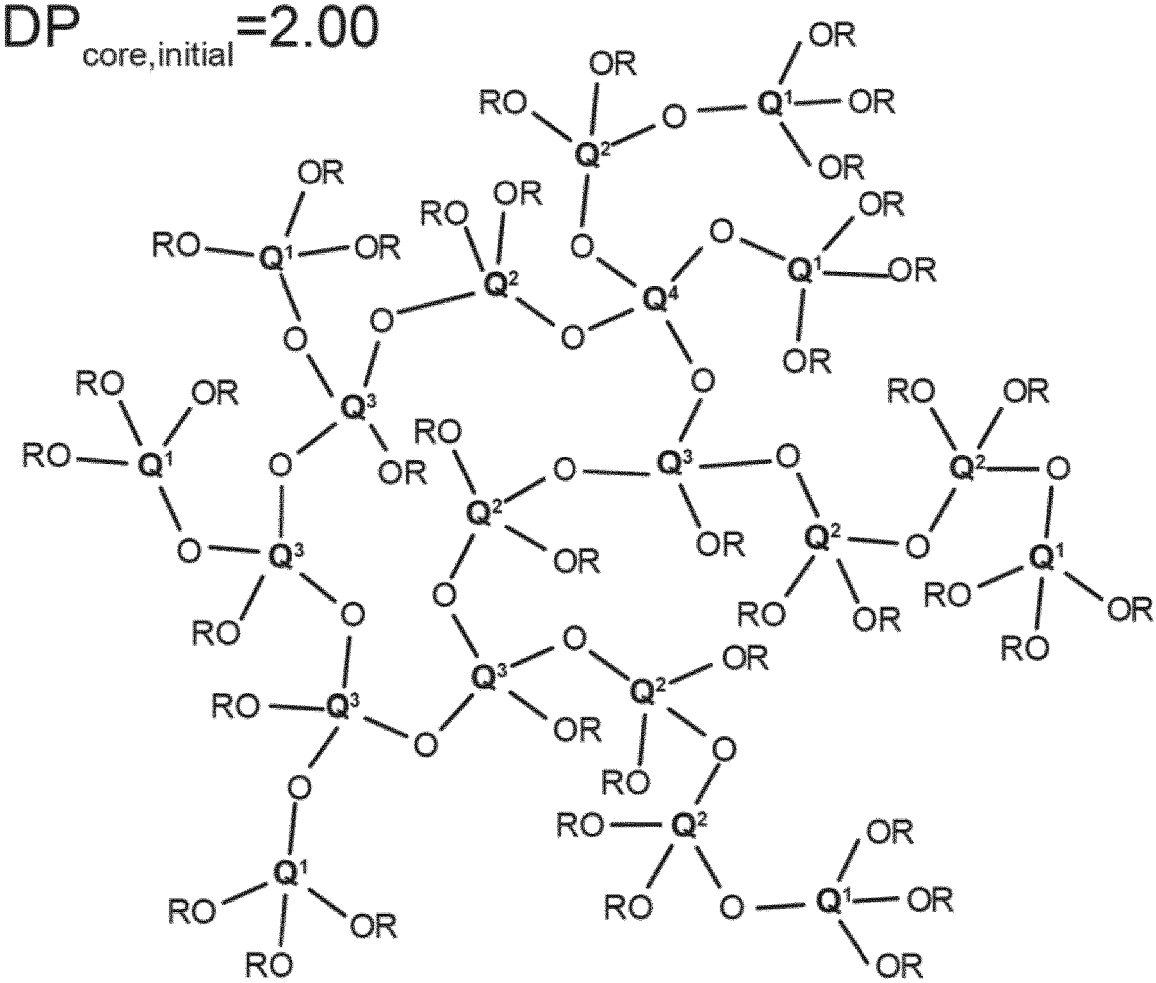
FIG. 6 a) to d), model sketches for various molecular building blocks exhibiting terminal chemical functionality and classification in terms of the relative content of functional groups ($n_{shell}/n_{core}$) and other defining parameters.
Figure 6B:
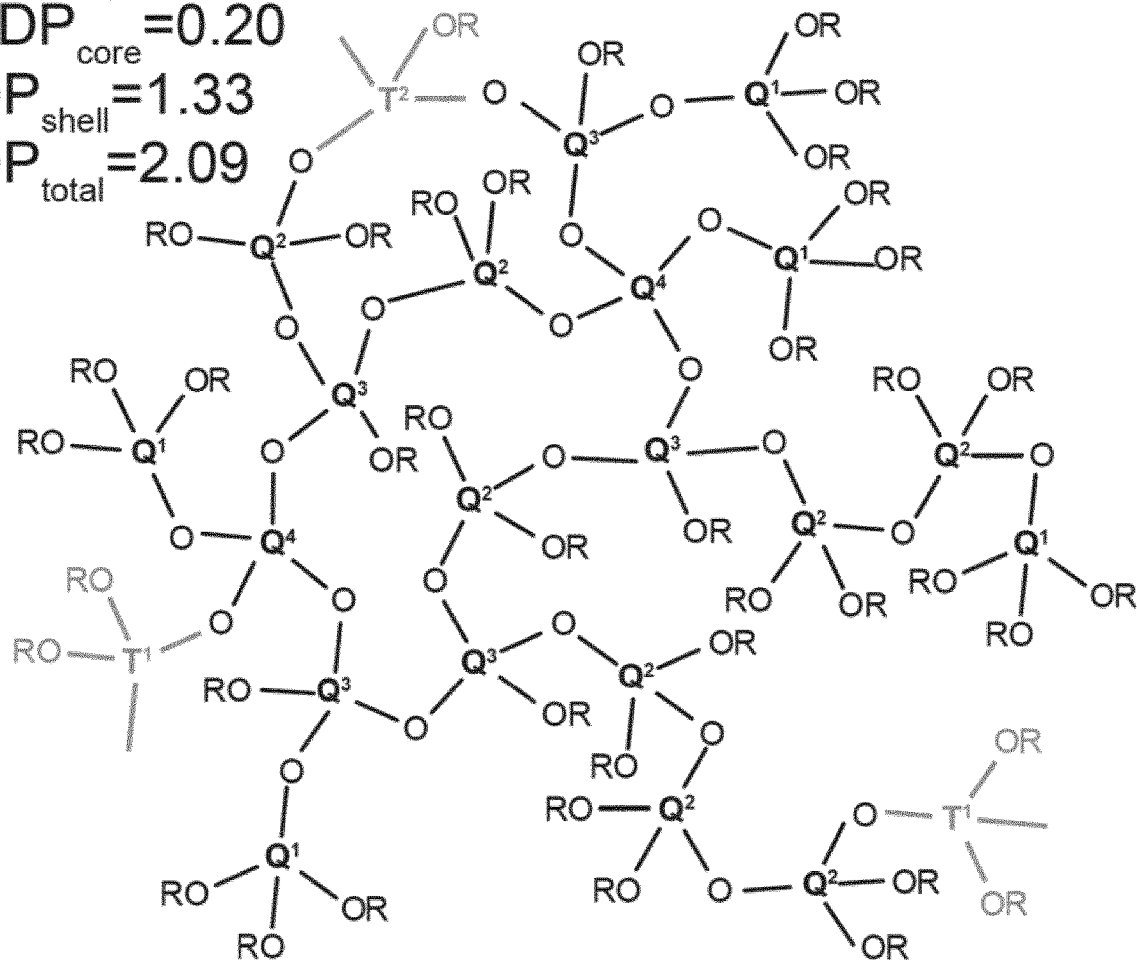
Figure 6C:
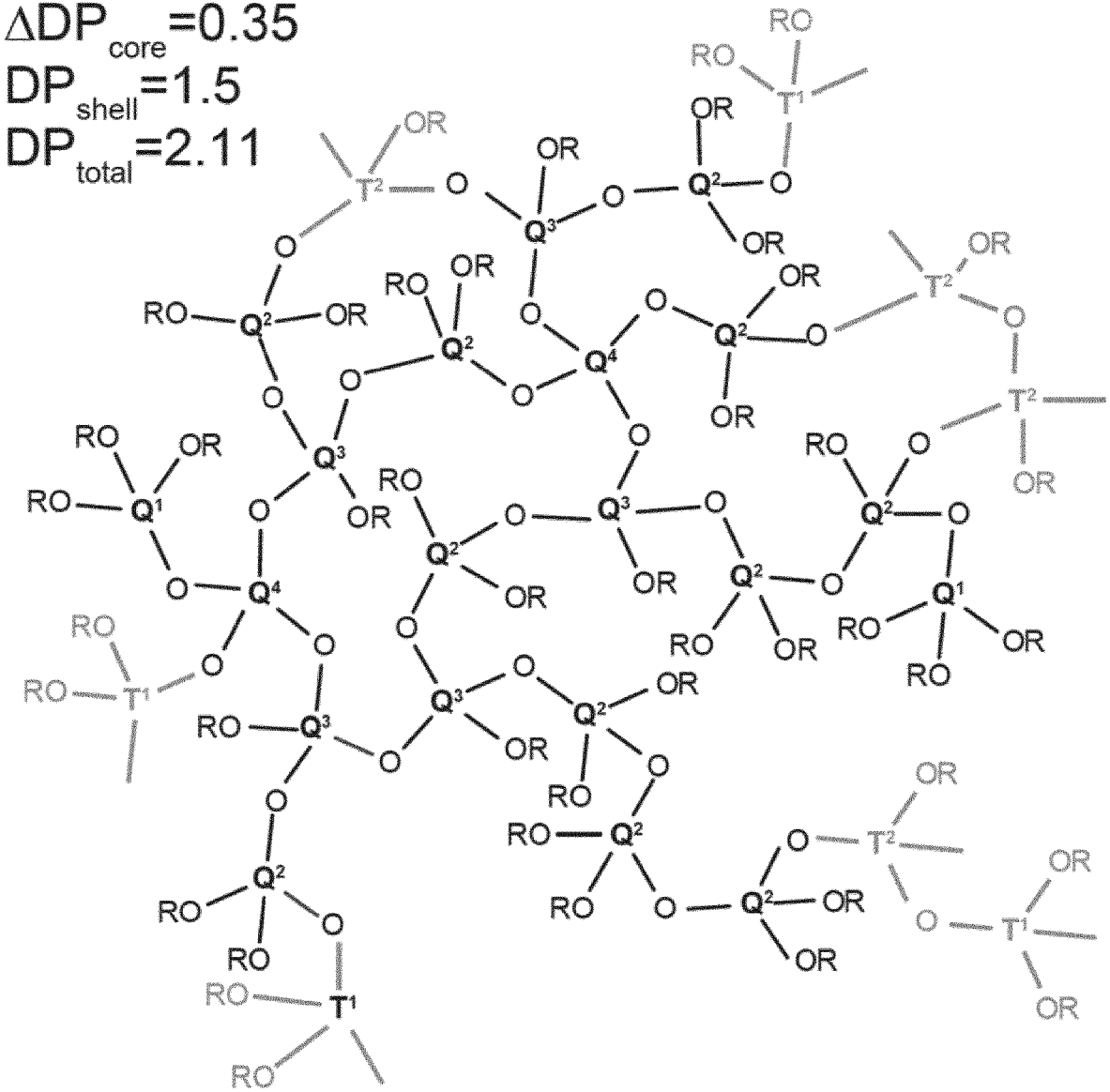
Figure 6D:
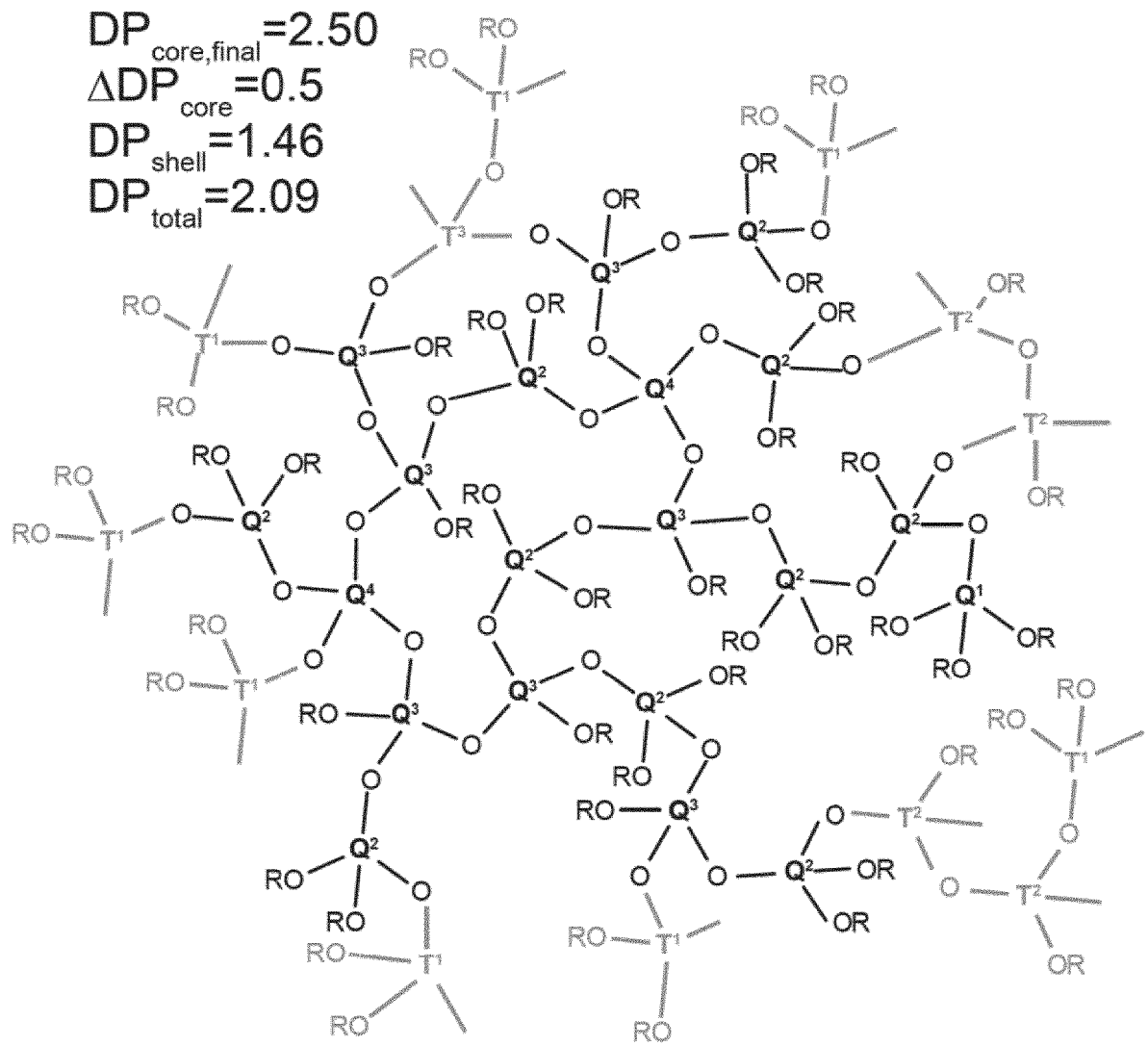
Figure 7:
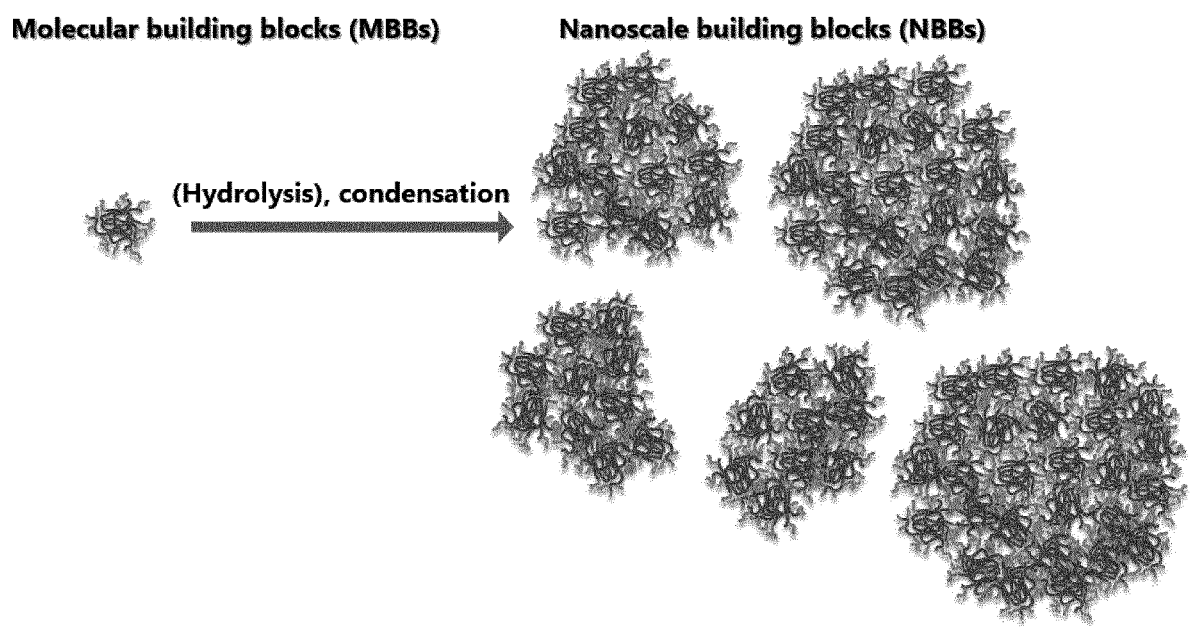
FIG. 7 a schematic illustration for the potential use of MBBs according to the present invention in applications: condensation and/or self-assembly leads to the formation of NBBs with homogeneous composition and custom tailorable surface chemistry.

Example 1: Synthesis of TEOS/MTES Core-Shell MBB with $n_{core}$:$n_{shell}$=1:0.43 i) Fabrication of the hyPAS Core with Targeted $DP_{core}=1.8/f=0.9$ 52 g/250 mmol of tetraethoxysilane (TEOS) and 0.83 ml of tetrakis(trimethylsiloxy) titanium (0.75 mol % with respect to TEOS) were placed inside a 250 ml round bottom flask with distillation bridge. 23.2 g/225 mmol acetic anhydride $Ac_2O$ was added to the mixture and the glassware setup briefly purged with nitrogen, sealed, left under nitrogen pressure (balloon) and immersed into a hot oil bath at 140° C. The reaction mixture was brought to temperature with stirring at 500 rpm. After about 10 minutes from the time of immersion, the onset of the reaction was evidenced by an accelerating refluxing rate of the reaction byproduct ethyl acetate which started to make its way up the distillation tube. After approximately 15 minutes, a continuous stream of ethyl acetate was distilling over through the distillation bridge and collected in the capture vessel. The reaction continued for a total time of about 45 more minutes, at which point it stopped, commensurate with the ceasing of the ethyl acetate distilling over. The collection vessel was removed after a total reaction time of 1 h and emptied, yielding a total volume of 41 ml of collected reaction byproduct mixture.

ii) Growth of an MTES Shell Over a hyPAS Core with Targeted $DP_{shell}=3.6/g=1.8$ In the shell growth step, the reaction mixture from the previous step a) was left stirring at the same reaction temperature (oil bath set to 140° C.) and a mixture consisting of 19.15 g/107 mmol MTES (methyltriethoxysilane) and 19.6 g/192 mmol acetic anhydride $Ac_2O$ was slowly added with a syringe pump over the course of about 100 minutes with continuing stirring. After approximately 10-15 minutes from the beginning of the dosing of the MTES/$Ac_2O$ mixture, the onset of ethyl acetate distilling over was again observed. After the addition was complete, the reaction mixture was kept stirring at temperature for another 20 minutes for a total reaction time of the shell growth step of approximately 2 hours. At the end of the reaction, with no more ethyl acetate boiling over, the heating source was removed from the reaction vessel and the mixture allowed cooling to room temperature. The crude product yield was 32.8 g of a viscous yellowish oil. The shell growth step also yielded 34 ml of distillate collected from the capture vessel.

Example 2: Synthesis of TEOS/VTES Core-Shell MBB with $n_{core}:n_{shell}=1:0.15$ i) Fabrication of the hyPAS Core with Targeted $DP_{core,initial}=2.4/f=1.2$ The TEOS derived hyPAS core was prepared analogous to Example 1 i), with identical catalyst amount, temperature and stirring rate. The amount of TEOS and $Ac_2O$ used for the synthesis were 52 g/250 mmol and 30.6 g/300 mmol, respectively yielding a theoretical f factor of 1.2. The total reaction time was 1 h 30 minutes and produced 55 ml of distillate byproduct.

ii) Growth of a VTES Shell Over a hyPAS Core with g=1.12

The overgrowth of the TEOS hyPAS core was prepared analogous to Example 1 ii), with the main difference being the type and amount of functional trialkoxysilane used for shell growth. Accordingly, 7.13 g/37.5 mmol of vinyltriethoxysilane (VTES) and 4.32 g/42 mmol of $Ac_2O$ were dosed over the course of 30 minutes. The crude product yield was 32.8 g of a slightly viscous yellowish oil. The shell growth step also yielded 10 ml of distillate collected from the capture vessel.

Examples 3-9: Synthesis of Various Two-Component Core-Shell MMBs with Trialkoxysilane Shell Chemistry i) Fabrication of the hyPAS Cores Pure tetraalkoxide hyPAS and mixed cores were prepared analogous to Example 1 i), with identical catalyst amount, temperature and stirring rate. The amounts of tetraalkoxide and optional functional trialkoysilane secondary precursor component as well as the selected amount of $Ac_2O$ used for the synthesis can be found in the above table for each experiment and are given in millimols [mmol]. The reaction time was 1 h 30 minutes.

ii) Growth of Organofunctional Trialkoxysilane Shells

In the second step, shells based on various organofunctional trialkoxysilanes and mixtures thereof were grown according to the general process described in example 1 ii). The exact reaction parameters are given in the table below. Furthermore, the reaction products were characterized by means of $^{29}Si$ NMR spectroscopy and the material parameters ($DP_{core, initial}$, $DP_{core, final}$, $DDP_{core}$, $DP_{shell}$, $DP_{total}$, $n_{shell}/n_{core}$) calculated using the equations given in the earlier discussion.

The set of examples presented here is to be viewed as experimental evidence for the broad applicability of the method and the wide range of materials chemistries accessible through it.

Examples 10-12: Synthesis of TEOS Core/(MTES/DMDES)-Shell MBBs with $N_{core}:n_{shell}=1:(0.25-0.3)$ The TEOS derived hyPAS core material was prepared analogous to Example 1 i), with identical catalyst amount, and stirring rate at an oil bath temperature of 140° C. The amount of TEOS and $Ac_2O$ used for the synthesis were 52 g/250 mmol and 25.5 g/250 mmol, respectively corresponding to a theoretical f factor of 1.0, ($DP_{core, initial}=2.0$). The reaction time for the core formation was 1 h 30 minutes. The amount of condensate recovered from the core formation steps in each case was 45 ml, indicative of the good reproducibility of the core formation step.

Following the core formation, the temperature of the oil bath was reduced to 120° C. to partially restrain losses of the more volatile DMDES monomer and the system allowed to equilibrate for 15 minutes. Shell growth was then triggered by the addition of the methyltriethoxysilane (MTES)/dimethyldiethoxysilane (DMDES) mixture over the course of 40 minutes by means of a laboratory syringe pump. The table below shows the selected shell composition parameters defined by the stoichiometry of added reagents (cells with bolded font) for examples 11 through 13. The theoretical g-factor used this series is around 1.1.

|  | $n_{shell}:n_{core}$ | $n_{MTES}$ [mmol] | $n_{MTES}$ [mmol] | $n_{Ac2O}$ [mmol] | g [ ] | $t_{reaction}$ [min] | $V_{condensate}$ [ml] |
|---|---|---|---|---|---|---|---|
| Example 10 | 0.29 | 47.7 | 25.1 | 84.6 | 1.16 | 100 | 16 |
| Example 11 | 0.30 | 37.8 | 37.3 | 79.3 | 1.05 | 115 | 13 |
| Example 12 | 0.27 | 25.2 | 43.3 | 74.0 | 1.09 | 85 | 10 |

The as obtained materials were transparent, slightly yellow oily liquids. The reaction mixtures were then further purified by distilling off unreacted monomers and acetic anhydride by evacuating the reaction vessel to 50 mbar, heating the mixture to 150° C. with continued stirring and holding at temperature/vacuum for a period of 40 minutes.

Examples 13-18: Gelation Tests of (TEOS/MTES) and (TEOS/VTES) Core-Shell NBB Derived NBB Hydrolysis Products A standard hydrolysis recipe was used to transform TEOS/MTES and TEOS/VTES core shell prepared with under identical conditions as given in example 1 but with varying $n_{shell}:n_{core}$ ratios and adjusted f factors, respectively to their corresponding NBB hydrolysis products. The following preparation scheme was used for the preparation of the NBB sol (hydrolysis products):

4.32 g (6.4 ml) of ethanol and 3.84 of NBB crude mixture with TEOS core/MTES shell were weighed in and heated to 40° C. in an Erlenmeyer beaker with stirring. After a waiting period of 5 minutes, 15 microliters of 10% $H_2SO_4$, 0.27 ml of distilled water were added to the mixture. After a brief homogenization period, the beaker was sealed off with parafilm, removed from the heating source and left standing under ambient condition for 60 hours.

The so-obtained NBB sols were then gelled using the following standard protocol: 7 ml of NBB sol were diluted with 16.3 ml of absolute ethanol denatured with 2% methyl ethyl ketone and 0.78 ml of distilled water in a 100 ml beaker. Next, 0.28 ml of 5.5M ammonia solution were added to the dilute sol and the mixture stirred for 5 minutes. The activated sol was then transferred to a 50×50×20 mm square plastic mold and allowed to gel at room temperature and the gelation time recorded.

From the above examples it can be seen that the gelation times are rather fast, especially by comparison with the reference examples given below. Furthermore, it is rather independent of the $n_{shell}/n_{core}$ ratio for MTES but increases rapidly with increasing $n_{shell}/n_{core}$ for the VTES functional materials.

Comparative Examples 19-24: Gelation Tests of (TEOS/MTES) and (TEOS/VIES) Sols Obtained by Classical Hydrolysis of Alkoxide Mixtures Classical hydrolysis was used to prepare standard sols from identical compound mixtures of TEOS/MTES and TEOS/VTES and their gelation times measured for comparison to the MBB→NBB approach according to this invention. The molar ratio TEO to (MTES/VTES) was varies over a range similar to above examples within a range of functional silane to TEOS molar ratio window ranging from 0.15 to 0.47.

Sols were prepared in an identical fashion as the above described hydrolyzed NBB sols: 4.32 g (6.4 ml) of ethanol and 3.84 of TEOS/MTES or TEOS VTES mixture, respectively, shell were weighed in and heated to 40° C. in an Erlenmeyer beaker with stirring. After a waiting period of 5 minutes, 15 microliters of 10% $H_2SO_4$, 0.27 ml of distilled water were added to the mixture. After a brief homogenization period, the beaker was sealed off with parafilm, removed from the heating source and left standing under ambient condition for 60 hours.

Again, a gelation protocol identical to the one in the above examples 18-23 was used to carry out the gelation tests. A summary of the comparative experiments is shown in the table below.

|  | Sol chemistry [cohydrolysis] | (MTES/VTES) to TEOS ratio | $n_{TEOS}$ [mmol] | $n_{MTES}$ [mmol] | $n_{VTES}$ [mmol] | $t_{reaction}$ [min] |
| --- | --- | --- | --- | --- | --- | --- |
| Example 19 | TEOS/MTES | 0.47 | 16.8 | 8.0 | — | >300 min |
| Example 20 | TEOS/MTES | 0.26 | 15.4 | 4.0 | — | >300 min |
| Example 21 | TEOS/MTES | 0.15 | 13.3 | 2.0 | — | >300 min |
| Example 22 | TEOS/VTES | 0.43 | 16.3 | — | 7.1 | >300 min |
| Example 23 | TEOS/VTES | 0.25 | 14.4 | — | 3.6 | >300 min |
| Example 24 | TEOS/VTES | 0.15 | 11.9 | — | 1.8 | >300 min |

All samples took more than 5 hours to gel and were left standing over night. Surprisingly, the next morning all samples had gelled. In conclusion, by comparison it becomes apparent that the sols obtained by classical hydrolysis gel much more slowly than their MBB→NBB sol derived analogues. This is attributed to the higher degree of control over the molecular scale building blocks of the sols obtained using the methodology described in this invention.

|  | Chemistry [core/shell] | $n_{shell}:n_{core}$ | f [ ] | g [ ] | $t_{gel}$ [min] |
| --- | --- | --- | --- | --- | --- |
| Example 13 | TEOS/MTES | 0.15 | 1.2 | 1.27 | 26 |
| Example 14 | TEOS/MTES | 0.30 | 1.0 | 1.27 | 34 |
| Example 15 | TEOS/MTES | 0.60 | 0.9 | 1.27 | 33 |
| Example 16 | TEOS/VTES | 0.15 | 1.2 | 1.12 | 30 |
| Example 17 | TEOS/VTES | 0.30 | 1.0 | 1.12 | 76 |
| Example 18 | TEOS/VTES | 0.60 | 0.9 | 1.12 | 220 |

OVERVIEW TABLE WITH EXAMPLES

| | Example Number | | | | |
|---|---|---|---|---|---|
| | 1 | 2 | 3 | 4 | 5 |
| System definition | TOES/ MTES | TEOS/ VTES | D-40 (1) | D-40 (2) | TMOS/ VTMS |
| Internal reference | 48 | 38 | 85 | 86 | 95 |
| $n_{shell}/n_{core}$ | 0.43 | 0.15 | 0.14 | 0.12 | 0.26 |
| f | 0.91 | 1.20 | 0.36 | 0.36 | 0.80 |
| g | 1.77 | 1.13 | 2.65 | 1.48 | 1.11 |
| $DC_{shell}$ | 3.55 | 2.26 | 5.30 | 2.95 | 2.21 |
| Reaction temperature (oil bath setting) | 140° C. | 140° C. | 140° C. | 140° C. | 110° C. |
| Catalyst | $Ti(OTMS)_4$ | $Ti(OTMS)_4$ | $Ti(OTMS)_4$ | $Ti(OTMS)_4$ | $Ti(OTMS)_4$ |
| Catalyst concentration [% mol based on $n_{core}$] | 0.7 | 0.7 | 0.7 | 0.7 | 0.7 |
| Stoichiometry used in experiments | [mols] | [mols] | [mols] | [mols] | [mols] |
| i) Core fabrication | | | | | |
| TEOS (tetraethylorthosilicate) | 0.250 | 0.250 | | | |
| TEOS-40 (tetraethylkorthosilicate oligomers) | | | 0.173 | 0.173 | |
| TMOS (tetramethylorthosilicate) | | | | | 0.250 |
| TTB (Titaniumtetrabutoxide) | | | | | |
| DEPETES ((Diethylphosphato-ethyl)triethoxysilane) | | | | | |
| Acetic anhydride ($AA_{core}$) | 0.227 | 0.300 | 0.062 | 0.062 | 0.200 |
| ii) shell growth | | | | | |
| MTES (Methyltriethoxysilane) | 0.107 | | 0.024 | | |
| DMDES (Dimethyldiethoxysilane) | | | | | |
| VTES (Vinyltriethoxysilane) | | 0.038 | | 0.021 | |
| VTMS (Vinyltrimethoxysilane) | | | | | 0.064 |
| DEPETES ((Diethylphosphato-ethyl)triethoxysilane) | | | | | |
| 3-TESPM (3-(Triethoxysilyl)propyl-methacrylate) | | | | | |
| BOC-APTES (BOC prot. aminopropyltriethoxysilane) | | | | | |
| Acetic anhydride ($AA_{shell}$) | 0.190 | 0.042 | 0.062 | 0.031 | 0.071 |

| | Example Number | | | | |
|---|---|---|---|---|---|
| | 6 | 7 | 8 | 9 | 13 |
| System definition | TEOS/ DEPETES | TEOS/ DEPETES | TEOS/3-TESPM | (TEOS + DEPETES)/ MTES | TEOS/ (MDES + DMDES) |
| Internal reference | 62 | 63 | 80 | 87 | 69 |
| $n_{shell}/n_{core}$ | 0.60 | 0.15 | 0.24 | 0.31 | 0.25 |
| f | 0.91 | 1.20 | 1.00 | 0.86 | 1.00 |
| g | 1.06 | 1.14 | 1.74 | 1.78 | 1.25 |
| $DC_{shell}$ | 2.12 | 2.27 | 3.48 | 3.55 | 2.50 |
| Reaction temperature (oil bath setting) | 140° C. | 140° C. | 140° C. | 140° C. | 140° C. |
| Catalyst | $Ti(OTMS)_4$ | $Ti(OTMS)_4$ | $Ti(OTMS)_4$ | $Ti(OTMS)_4$ | $Ti(OTMS)_5$ |
| Catalyst concentration [% mol based on $n_{core}$] | 0.7 | 0.7 | 0.7 | 0.7 | 0.7 |
| Stoichiometry used in experiments | [mols] | [mols] | [mols] | [mols] | [mols] |
| i) Core fabrication | | | | | |
| TEOS (tetraethylorthosilicate) | 0.250 | 0.250 | 0.250 | 0.107 | 0.250 |
| TEOS-40 (tetraethylkorthosilicate oligomers) | | | | | |
| TMOS (tetramethylorthosilicate) | | | | | |
| TTB (Titaniumtetrabutoxide) | | | | | |
| DEPETES ((Diethylphosphato-ethyl)triethoxysilane) | | | | 0.024 | |
| Acetic anhydride ($AA_{core}$) | 0.227 | 0.300 | 0.250 | 0.113 | 0.250 |
| ii) shell growth | | | | | |
| MTES (Methyltriethoxysilane) | | | | 0.040 | 0.027 |
| DMDES (Dimethyldiethoxysilane) | | | | | 0.036 |
| VTES (Vinyltriethoxysilane) | | | | | |
| VTMS (Vinyltrimethoxysilane) | | | | | |

-continued

| | | | | | |
|---|---|---|---|---|---|
| DEPETES ((Diethylphosphato-ethyl)triethoxysilane) | 0.150 | 0.037 | | | |
| 3-TESPM (3-(Triethoxysilyl)propyl-methacrylate) | | | 0.061 | | |
| BOC-APTES (BOC prot. aminopropyltriethoxysilane) | | | | | |
| Acetic anhydride ($AA_{shell}$) | 0.159 | 0.042 | 0.106 | 0.071 | 0.079 |

| Summary of results | 1 | 2 | 3 | 4 | 5 | 6 | 7 | 8 | 9 | 13 |
|---|---|---|---|---|---|---|---|---|---|---|
| $n_{shell}/n_{core}$ (NMR) | 0.38 | 0.14 | 0.10 | 0.10 | 0.23 | 0.62 | 0.14 | 0.26 | n.d. | 0.22 |
| $DP_{total}$ from stoichiometry | 2.34 | 2.38 | n.d. | n.d. | 2.17 | 1.93 | 2.38 | 2.29 | 2.16 | 2.10 |
| $DP_{total}$ (from NMR) | 2.26 | 2.22 | 2.48 | 2.42 | 1.86 | 1.31 | 2.07 | 1.98 | n.d. | 1.95 |
| $DP_{core,final}$ (from NMR) | 2.33 | 2.30 | 2.52 | 2.48 | 1.94 | 1.87 | 2.21 | 2.08 | n.d. | 2.10 |
| $DP_{core,initial}$ (from stoichiometry) | 1.82 | 2.40 | 0.72 | 0.72 | 1.60 | 1.82 | 2.40 | 2.00 | 1.73 | 2.00 |
| $DP_{core,initial}$ (from NMR) | n.d. | n.d. | n.d. | n.d. | 1.73 | n.d. | n.d. | n.d. | n.d. | n.d. |
| Delta $DP_{core}$ (from NMR) | n.d. | n.d. | n.d. | n.d. | 0.22 | n.d. | n.d. | n.d. | n.d. | n.d. |
| $DC_{shell} = 2 \cdot g$ (from stoichiometry) | 3.55 | 2.26 | 5.30 | 2.95 | 2.21 | 2.12 | 2.27 | 3.48 | 3.55 | 2.50 |
| $(n_{core}/n_{shell} \cdot DeltaDP_{core}) + DP_{shell}$ (from NMR) | n.d. | n.d. | n.d. | n.d. | 2.37 | n.d. | n.d. | n.d. | n.d. | n.d. |
| $DP_{shell}$ (from NMR) | 2.08 | 1.63 | 2.06 | 1.86 | 1.52 | 0.40 | 1.06 | 1.58 | n.d. | 1.29 |
| $Q_n$ speciation, initial (core), normalized | | | | | | | | | | |
| $Q_4$ | n.d. | n.d. | n.d. | n.d. | 3.0 | n.d. | n.d. | n.d. | n.d. | n.d. |
| $Q_3$ | n.d. | n.d. | n.d. | n.d. | 13.3 | n.d. | n.d. | n.d. | n.d. | n.d. |
| $Q_2$ | n.d. | n.d. | n.d. | n.d. | 41.9 | n.d. | n.d. | n.d. | n.d. | n.d. |
| $Q_1$ | n.d. | n.d. | n.d. | n.d. | 37.2 | n.d. | n.d. | n.d. | n.d. | n.d. |
| $Q_0$ | n.d. | n.d. | n.d. | n.d. | 4.7 | n.d. | n.d. | n.d. | n.d. | n.d. |
| $DP_{core,initial\ NMR}$ | n.d. | n.d. | n.d. | n.d. | 1.7 | n.d. | n.d. | n.d. | n.d. | n.d. |
| $Q_n$ speciation, final, after shell growth, normalized | | | | | | | | | | |
| $Q_4$ | 7.9 | 6.0 | 11.4 | 10.6 | 3.6 | 2.5 | 4.5 | 5.4 | n.d. | 5.3 |
| $Q_3$ | 36.1 | 36.9 | 41.9 | 40.4 | 21.4 | 19.7 | 32.0 | 27.5 | n.d. | 26.7 |
| $Q_2$ | 39.8 | 40.3 | 35.3 | 36.8 | 44.7 | 43.7 | 44.1 | 41.5 | n.d. | 43.2 |
| $Q_1$ | 13.6 | 14.1 | 10.2 | 10.7 | 26.4 | 30.6 | 18.5 | 21.2 | n.d. | 22.6 |
| $Q_0$ | 2.6 | 2.6 | 1.2 | 1.5 | 4.0 | 3.5 | 0.9 | 4.4 | n.d. | 2.2 |
| $DP_{core,final\ NMR}$ | 2.3 | 2.3 | 2.5 | 2.5 | 1.9 | 1.9 | 2.2 | 2.1 | n.d. | 2.1 |
| Delta $DP_{core}$ | n.d. | n.d. | n.d. | n.d. | 0.22 | n.d. | n.d. | n.d. | n.d. | n.d. |
| Consumption of $AA_{shell}$ for Delta $DP_{core}$ (mols) | n.d. | n.d. | n.d. | n.d. | 0.03 | n.d. | n.d. | n.d. | n.d. | n.d. |
| $AA_{shell}$ left for $T_m$ condensation (mols) | n.d. | n.d. | n.d. | n.d. | 0.04 | n.d. | n.d. | n.d. | n.d. | n.d. |
| $T_m$ speciation, after shell growth, normalized | | | | | | | | | | |
| $T_3$ | 32.5 | 10.2 | 29.3 | 17.3 | 9.1 | 0.0 | 1.2 | 11.8 | n.d. | 14.2 |
| $T_2$ | 45.9 | 48.9 | 49.0 | 52.3 | 41.7 | 6.6 | 28.1 | 43.5 | n.d. | 37.2 |
| $T_1$ | 18.8 | 34.4 | 19.9 | 29.8 | 41.6 | 26.9 | 46.0 | 35.9 | n.d. | 28.9 |
| $T_0$ | 2.8 | 6.5 | 1.8 | 0.6 | 7.6 | 66.5 | 24.7 | 8.8 | n.d. | 19.7 |
| $DP_{shell}$ from leftover $AA_{shell}$ | n.d. | n.d. | n.d. | n.d. | 1.37 | n.d. | n.d. | n.d. | n.d. | n.d. |
| $DP_{shell}$ from NMR (T + D) | 2.08 | 1.63 | 2.06 | 1.86 | 1.52 | 0.40 | 1.06 | 1.58 | n.d. | 1.29 |
| $Q_n$ and $T_m$ species final, normalized to total | | | | | | | | | | |
| $Q_4$ | 5.7 | 5.3 | 10.4 | 9.7 | 2.9 | 1.5 | 4.0 | 4.3 | n.d. | 4.3 |
| $Q_3$ | 26.2 | 32.5 | 38.1 | 36.6 | 17.4 | 12.2 | 28.2 | 21.8 | n.d. | 21.8 |
| $Q_2$ | 28.8 | 35.5 | 32.1 | 33.4 | 36.3 | 27.0 | 38.9 | 33.0 | n.d. | 35.3 |
| $Q_1$ | 9.8 | 12.4 | 9.2 | 9.7 | 21.4 | 18.9 | 16.3 | 16.8 | n.d. | 18.5 |
| $Q_0$ | 1.9 | 2.3 | 1.0 | 1.4 | 3.2 | 2.2 | 0.8 | 3.5 | n.d. | 1.8 |
| $T_3$ | 9.0 | 1.2 | 2.7 | 1.6 | 1.7 | 0.0 | 0.1 | 2.4 | n.d. | 1.2 |
| $T_2$ | 12.6 | 5.9 | 4.5 | 4.8 | 7.8 | 2.5 | 3.4 | 9.0 | n.d. | 3.1 |
| $T_2$ | 5.2 | 4.1 | 1.8 | 2.8 | 7.8 | 10.4 | 5.5 | 7.4 | n.d. | 2.4 |
| $T_0$ | 0.8 | 0.8 | 0.2 | 0.1 | 1.4 | 25.6 | 2.9 | 1.8 | n.d. | 1.6 |
| $D_2$ | 0.0 | 0.0 | 0.0 | 0.0 | 0.0 | 0.0 | 0.0 | 0.0 | n.d. | 4.2 |
| $D_1$ | 0.0 | 0.0 | 0.0 | 0.0 | 0.0 | 0.0 | 0.0 | 0.0 | n.d. | 3.0 |
| $D_0$ | 0.0 | 0.0 | 0.0 | 0.0 | 0.0 | 0.0 | 0.0 | 0.0 | n.d. | 2.7 |

The invention claimed is:

1. A method for preparing a polymeric liquid material formed of molecular building blocks of core-shell type architecture, the method comprising:
   a) charging at least one silicon tetraalkoxide Si(OR)$_4$, wherein R is an unbranched or branched alkyl group with up to four carbon atoms; and, optionally, a functional admixture of
      one R"-organofunctional trialkoxysilane R"—Si(OR)$_3$ and, optionally, an R$_3$,R$_4$-organofunctional dialkoxysilane R$_3$—Si(OR)$_2$—R$_4$; or
      a mixture of different R"-organofunctional trialkoxysilanes and, optionally, at least one R$_3$,R$_4$-organofunctional dialkoxysilane;
      in monomeric or in oligomeric form, into a reaction vessel together with a first stoichiometric amount of acetic anhydride selected according to the desired DP$_{core}$, in the presence of a catalyst;
   b) heating up the reaction mixture provided in a) in a water-free, inert atmosphere under stirring to reach a desired reaction temperature and distilling off resulting acetic acid ester reaction product until the reaction and the flow of distillate stop, thereby forming said hyperbranched polysiloxane core;
   c) adding
      one R'-organofunctional trialkoxysilane R'—Si(OR)$_3$ and, optionally, an R$_1$,R$_2$-organofunctional dialkoxysilane R$_1$—Si(OR)$_2$—R$_2$, or
      a mixture of different R'-organofunctional trialkoxysilanes and, optionally, at least one R$_1$,R$_2$-organofunctional dialkoxysilane,
      wherein:
      R' and R" are independently selected substituents each representable as L-Z, wherein
      L is a linker group selected from the group consisting of —C$_6$H$_4$—, —C$_6$H$_4$—CH$_2$—, —CH$_2$—CH$_2$—C$_6$H$_4$—CH$_2$— and —[(CH)$_2$]$_n$— with n=0, 1, 2, 3, 4; and
      Z is a terminal functional group selected from the following:

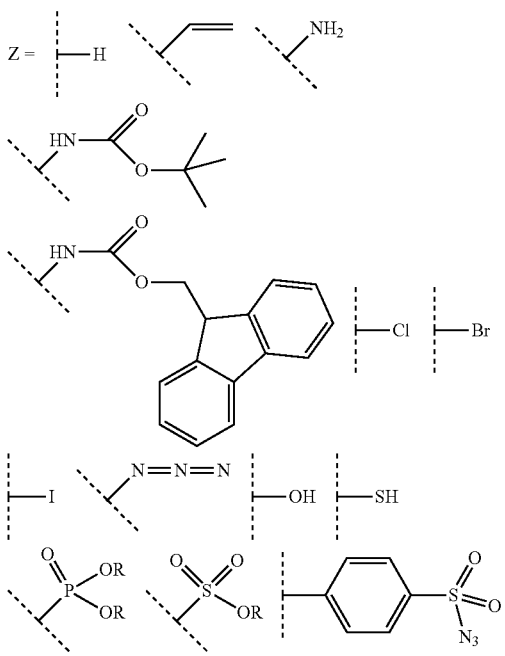

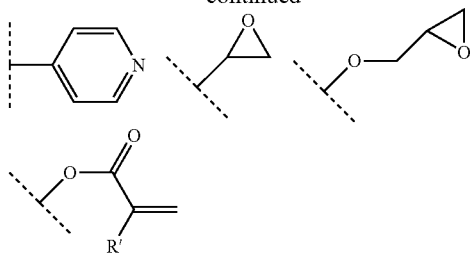

wherein R* is selected from the group consisting of —H, —CH$_3$, —C$_2$H$_5$, —C$_3$H$_8$, —C$_4$H$_{10}$ and —C$_6$H$_5$;
   or Z is —[(CH)$_2$]$_m$—CH$_3$ with m=0, 1, 2, . . . , 11;
   and
   wherein R$_1$, R$_2$, R$_3$ and R$_4$ are substituents independently selected from the group consisting of —CH$_3$, —C$_2$H$_5$, —C$_6$H$_5$, —C$_6$H$_{11}$, —CH=CH$_2$, —CH$_2$—CH$_2$—Cl and —C$_5$H$_5$, with the provision that the triplets (R', R$_1$, R$_2$) and (R", R$_3$, Ra) are not identical;
   together with a second stoichiometric amount of acetic anhydride selected according to the desired DP$_{shell}$, optionally in the presence of a catalyst, to the hot reaction mixture formed in b) with continuing stirring, thus initiating a selective build-up of said functional siloxane shell onto the core produced in b), whereby further acetic acid ester is formed and distilled over, and continuing the reaction until the distillate flow ceases again;
   d) optionally building additional functional layers in the shell by repeating the addition and reaction protocol described in c) at least once;
   e) optionally removing low-molecular reaction products and/or residual starting materials in the reaction mixture by vacuum distillation through gradually lowering the pressure inside the reaction vessel and holding a final pressure in the range of 5 to 250 mbar for a period of time between 10 and 120 minutes,
   f) cooling down and isolating the polymeric liquid material thus obtained;
   wherein a) through e) are carried out in one and the same reaction vessel.

2. The method according to claim 1, wherein said functional admixture is zero.

3. The method according to claim 1, wherein R is methyl or ethyl.

4. The method according to claim 1, wherein the reaction temperature for steps b) through e) is in the range from 70° C. to 170° C., and the pressure during b) through d) is in the range of 0.1 bar to 2 bar.

5. The method according to claim 1, wherein the silicon tetraalkoxide Si(OR)$_4$ is tetraethoxysilane (TEOS) or tetramethoxysilane (TMOS) or a mixture of monomers and oligomers thereof.

6. The method according to claim 1, wherein an acetic acid ester reaction product is removed from the system through a distillation column comprising several theoretical plates in such a way that the lower boiling reaction product is separated from higher boiling residual reactants in solution whereby the latter are continuously fed back into the reaction mixture.

7. The method according to claim 1, wherein the catalyst is:
Ti(OR")$_4$ or Zn(II)alkanolates Zn(OR")$_2$, wherein R"=—CH$_2$CH$_3$, —CH(CH$_3$)$_2$, —CH$_2$CH$_2$CH$_3$, —C(CH$_3$)$_3$, —CH$_2$CH$_2$CH$_2$CH$_3$, or
the catalyst is Ti(O—Si(CH$_3$)$_3$)$_4$, wherein and the catalyst amount is between 0.01 and 1.5% on a mol basis of total alkoxysilane precursor used.

8. The method according to claim 1, wherein R' is:
i) R'=—C$_6$H$_5$, —CH=CH$_2$,
ii) R'=L-Z and L is —CH$_2$— and Z=—[(CH$_2$)$_2$]$_p$—CH$_3$ with p=0, 1, 2, 4, 6, 8, 10, 12, 14,
iii) R'=L-Z and L=—CH$_2$CH$_2$CH$_2$— (n-propyl) and Z=—Br, —Cl, —I, —SH, —OH, —NH$_2$, —NH—(BOC), —NH—(FMOC), -(2-oxiranyl), -methoxy-(2-oxiranyl), —N$_3$, —SO$_3$R, —PO$_3$R$_2$, —acrylate, -methacrylate, -ethacrylate, -propacrylate, -butacrylate, or
iv) R'=L-Z and L=CH$_2$, Z=vinyl, -acrylate, -methacrylate, -ethacrylate, -propacrylate, -butacrylate,
and wherein R$_1$ and R$_2$ are equal and selected from the group consisting of —CH$_3$, C$_6$H$_5$, and —CH=CH$_2$ or wherein R$_1$=—CH$_3$ and R$_2$=—CH=CH$_2$.

9. A polymeric liquid material, the material being formed of molecular building blocks of core-shell type architecture, each building block consisting of a hyperbranched polysiloxane core and a functional siloxane shell peripherally attached to said core,
the material containing less than 0.5 mass percent hydroxy moieties (Si—OH),
the core having a degree of polymerization DP$_{core}$ in the range of 1.3 to 2.7,
the shell being formed of R'-substituted siloxane moieties and optionally R1-,R2-substituted siloxane moieties and having a degree of polymerization DP$_{shell}$ in the range of 0.3 to 2.5,
wherein the total silicon to free hydrolysable alkoxy molar ratio in the material is 1:1.25 to 1:2.75,
wherein the material has a viscosity in the range of 10 to 100,000 cP,
and wherein the core is composed of non-organofunctional siloxane moieties comprising
non-organofunctional terminally bonded siloxane moieties (Q$^1$ speciation) of the general formula

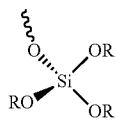

Q$^1$ and/or
non-organofunctional disiloxane moieties (Q$^2$ speciation) of the general formula

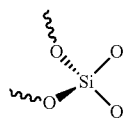

Q$^2$ and/or
non-organofunctional trisiloxane moieties (Q$^3$ speciation) of the general formula

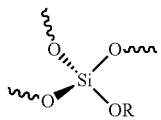

Q$^3$ and/or
non-organofunctional tetrasiloxane moieties (Q$^4$ speciation) of the general formula

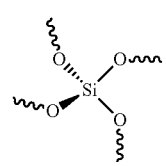

Q$^4$ and wherein the shell is composed of:
monoorganofunctional terminally bonded siloxane moieties (T$^1$ speciation) of the general formula

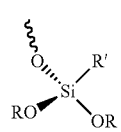

T$^1$ and/or
monoorganofunctional disiloxane moieties (T$^2$ speciation) of the general formula

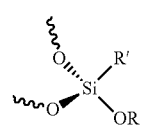

T$^2$ and/or
monoorganofunctional trisiloxane (T$^3$ speciation) moieties of the general formula

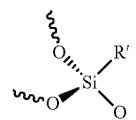

T$^3$ and, optionally,
terminally bonded diorganofunctional siloxane (D$^1$ speciation) moieties of the general formula

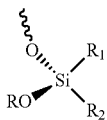

and/or
diorganofunctional disiloxane (D² speciation) moieties of the general formula

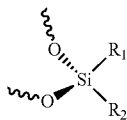

wherein R, R', R₁ and R₂ are as defined in claim 1.

10. The polymeric liquid material according to claim 9, wherein the relative atomic ratio of T to Q species is in the range 0.03:1 to 1:1.

11. A hydrolysis product, wherein the product comprises a reaction product of the polymeric liquid material according to claim 9 and a predetermined amount of water or a predetermined amount of a water-solvent mixture.

12. A method comprising:
providing the polymeric liquid material according to claim 9
in a coating or adhesive formulation or as a coupling agent to mediate incorporation of fillers into polymer matrices via the polymeric liquid material, or
as a precursor for sol-gel chemical technology and preparing organofunctional gels and inorganic/organic nanocomposite materials as well as aerogels and xerogels derived thereof.

13. A method comprising:
providing hydrolysis product according to claim 11 in a coating or adhesive formulation or as a coupling agent to mediate the incorporation of fillers into polymer matrices via the polymeric liquid material, or as a precursor for sol-gel chemical technology, and preparing organofunctional gels and inorganic/organic nanocomposite materials as well as aerogels and xerogels derived thereof.

14. The method according to claim 4, wherein the reaction temperature for b) through e) is in the range of 100° C. to 150° C. and the pressure during b) through d) is in the range of 0.5 bar to 1.4 bar.

15. The method according to claim 14, wherein the reaction temperature for b) through e) is in the range from 120° C. to 140° C. and the pressure during b) through d) is in the range of 0.9 bar to 1.2 bar.

16. The polymeric liquid material according to claim 9, wherein
the core has a degree of polymerization $DP_{core}$ in the range of 1.5 to 2.5, and
the shell is formed of R'-substituted siloxane moieties and optionally R1-, R2-substituted siloxane moieties and has a degree of polymerization $DP_{shell}$ in the range of 1.0 to 2.3.

17. The polymeric liquid material according to claim 16, wherein
the shell is formed of R'-substituted siloxane moieties and R1-, R2-substituted siloxane moieties.

18. The polymeric liquid material according to claim 10, wherein the relative atomic ratio of T to Q species is in the range 0.03:1 to 0.75:1.

19. The polymeric liquid material according to claim 17, wherein the relative atomic ratio of T to Q species is in the range 0.05:1 to 0.5:1.

* * * * *